US012688384B2

(12) United States Patent
Ikeda et al.

(10) Patent No.: US 12,688,384 B2
(45) Date of Patent: Jul. 21, 2026

(54) OPTICAL INFORMATION READING DEVICE

(71) Applicant: KEYENCE CORPORATION, Osaka (JP)

(72) Inventors: Takayuki Ikeda, Osaka (JP); Koji Takahashi, Osaka (JP); Taku Kawai, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 0 days.

(21) Appl. No.: 19/181,725

(22) Filed: Apr. 17, 2025

(65) Prior Publication Data

US 2025/0342331 A1 Nov. 6, 2025

(30) Foreign Application Priority Data

May 1, 2024 (JP) ................................. 2024-074155

(51) Int. Cl.
*G06K 7/14* (2006.01)
*G06K 7/10* (2006.01)

(52) U.S. Cl.
CPC ....... *G06K 7/1413* (2013.01); *G06K 7/10881* (2013.01)

(58) Field of Classification Search
None
See application file for complete search history.

(56) References Cited

U.S. PATENT DOCUMENTS

| | | | |
|---|---|---|---|
| 7,195,169 B2 | 3/2007 | Bhatia et al. | |
| D894,903 S | 9/2020 | Endo et al. | |
| 11,308,296 B2 | 4/2022 | Ohori et al. | |
| 2017/0140188 A1* | 5/2017 | Izaki | ................... G06K 7/1417 |
| 2020/0320263 A1* | 10/2020 | Kubota | .............. G06K 7/10732 |

FOREIGN PATENT DOCUMENTS

| | | |
|---|---|---|
| JP | 2006-209208 A | 8/2006 |
| JP | 2020-177309 A | 10/2020 |

OTHER PUBLICATIONS

Co-pending application: U.S. Appl. No. 19/181,714, filed Apr. 17, 2025, counterpart JP Patent Application No. 2024-080573.
Co-pending application: U.S. Appl. No. 19/181,732, filed Apr. 17, 2025, counterpart JP Patent Application No. 2024-074156.

* cited by examiner

*Primary Examiner* — Kristy A Haupt
(74) *Attorney, Agent, or Firm* — WHDA, LLP

(57) ABSTRACT

The optical information reading device includes an imaging unit, a reading unit, a housing, a grip portion, a push button, a first light-emitting unit, and a control unit. The imaging unit captures images in a predetermined direction, and the reading unit reads information from the images generated by imaging. The housing has the imaging unit and the reading unit arranged inside, and has a first main surface and a second main surface. The first main surface has a display unit. The second main surface is the opposite surface of the first main surface. The grip portion extends from the end on the opposite side of the predetermined direction on the display unit. The push button is pressed in the pressing direction to start imaging. The first light-emitting unit is provided on at least one of the side surfaces and the second main surface.

17 Claims, 27 Drawing Sheets

OPTICAL INFORMATION READING DEVICE

CROSS-REFERENCE TO RELATED APPLICATIONS

The present application claims foreign priority based on Japanese Patent Application No. 2024-074155, filed May 1, 2024, the contents of which are incorporated herein by reference.

BACKGROUND OF THE INVENTION

1. Technical Field

This disclosure relates to optical information reading devices such as handy terminals.

2. Description of the Related Art

An optical information reading device is a device that captures an image of a symbol that is the reading target and reads the information of the captured symbol. The optical information reading device allows the user to grasp the reading situation.

The optical information reading device described in JP 2020-177309 A includes a display unit (display module) 11 on its top surface.

The display unit 11 displays information. Although not explicitly stated in JP 2020-177309 A, a typical optical information reading device includes not only a display unit but also a light-emitting unit on its top surface. The light-emitting unit emits light based on the reading situation.

When the optical information reading device described in JP 2020-177309 A is used at an angle where the top surface (first main surface) is positioned outside the user's field of view, such as at a position higher than the user's eye level, the user cannot visually recognize the light-emitting unit on the top surface (first main surface).

In other words, in the optical information reading device described in JP 2020-177309 A, when the user cannot visually recognize the top surface (first main surface), even if the light-emitting unit on the top surface (first main surface) emits light, the user cannot grasp the reading situation from the light-emitting unit.

SUMMARY OF THE INVENTION

This disclosure is made in view of the above problem and aims to provide an optical information reading device that allows the user to grasp the reading status even when in a posture where the first main surface cannot be visually recognized.

According to one aspect of this disclosure, an optical information reading device is a device that captures an image of a symbol to be read and reads information of the captured symbol. The optical information reading device includes an imaging unit, a reading unit, and a housing. The imaging unit captures images in a predetermined direction. The reading unit reads symbol information from the image generated by the imaging unit's capture. The housing has the imaging unit and the reading unit arranged inside. The housing has a first main surface and a second main surface. The first main surface has a display unit that displays information. The second main surface is opposite to the first main surface. The optical information reading device further includes a grip portion, a push button, a first light-emitting unit, and a control unit. The grip portion extends from the end opposite to the predetermined direction on the display unit. The push button, when pressed in the pressing direction, starts the imaging by the imaging unit. The first light-emitting unit is provided on at least one of the side surface connecting the first main surface and the second main surface, and the second main surface. The control unit causes the first light-emitting unit to emit light based on the reading situation by the reading unit.

According to the optical information reading device of this disclosure, the user can grasp the reading situation even in a posture where the first main surface cannot be visually recognized.

DETAILED DESCRIPTION

Figure 1:
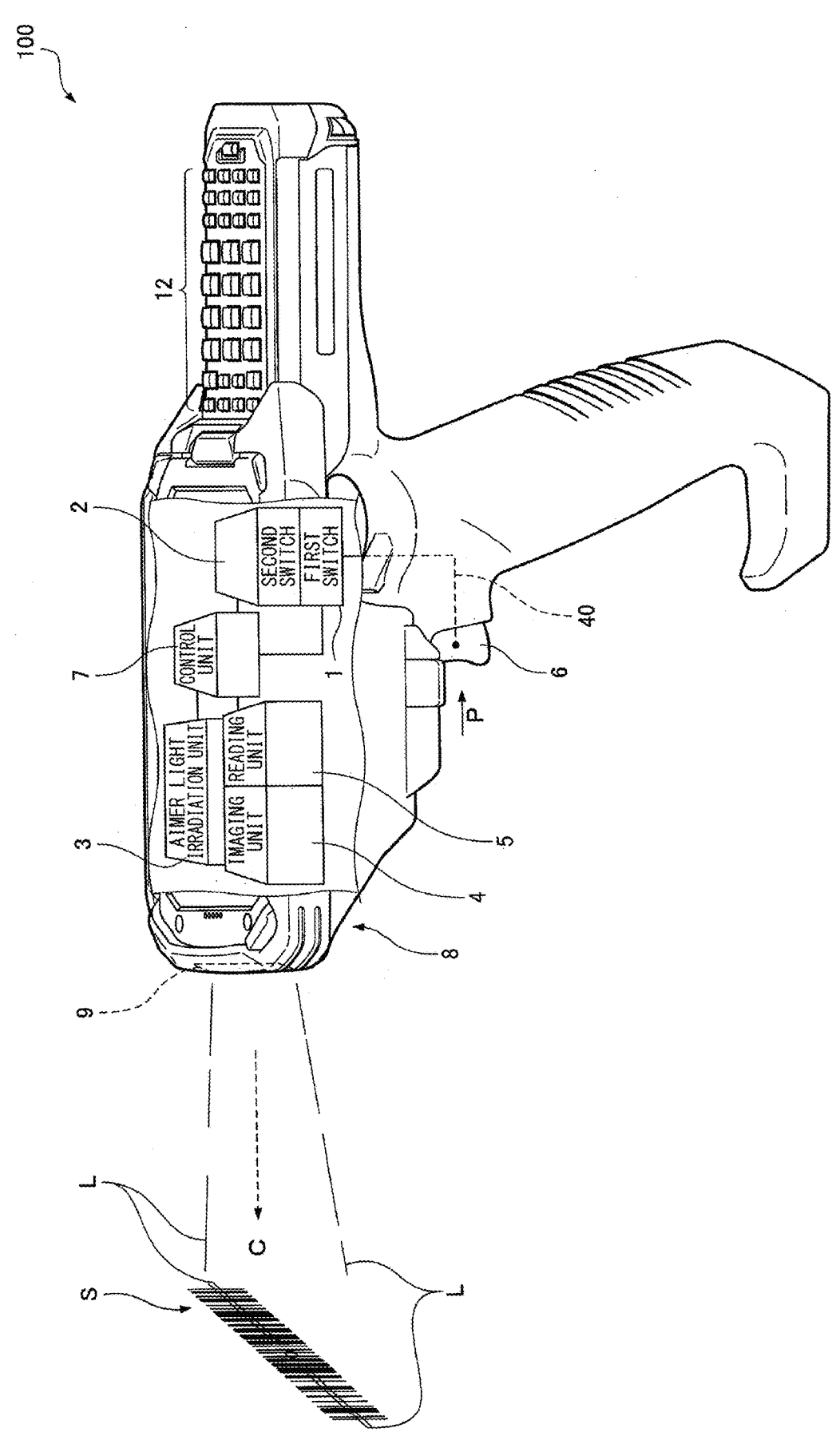
FIG. 1 is a perspective view of an optical information reading device according to Embodiment 1 viewed from the upper side.

The following describes embodiments of this disclosure with reference to the drawings. In the figures, the same or corresponding parts are given the same reference numerals, and explanations are not repeated.

In the following description, terms indicating position or direction such as "up", "down", "left", and "right" may be used. These terms are used for convenience to facilitate understanding of the embodiments and, unless explicitly stated otherwise, are not related to the actual direction when implemented.

Embodiment 1

The following description will be given of an optical information reading device 100 according to Embodiment 1 of this disclosure with reference to the drawings. First, with reference to FIG. 1, an outline of the optical information reading device 100 according to Embodiment 1 will be explained. FIG. 1 is a perspective view of the optical information reading device 100 according to Embodiment 1 viewed from the upper side.

As shown in FIG. 1, the optical information reading device 100 is a device that captures an image of a symbol S to be read and reads the information of the captured symbol S. The optical information reading device 100 includes an aimer light irradiation unit 3, an imaging unit 4, a reading unit 5, a push button 6, a first switch 1, a second switch 2, and a control unit 7.

The aimer light irradiation unit 3 irradiates aiming light L in a predetermined direction C. The imaging unit 4 captures images in the predetermined direction C. The reading unit 5 reads information of the symbol S from the image generated by the imaging of the imaging unit 4. The push button 6 can be pressed in the pressing direction P.

The first switch 1 is actuated when the push button 6 is pressed in the pressing direction P by the first pressing amount. The second switch 2 is actuated when the push button 6 is pressed in the pressing direction P by the second pressing amount, which is larger than the first pressing amount.

The control unit 7 controls the aimer light irradiation unit 3 and the imaging unit 4. When the first switch 1 is actuated, the control unit 7 causes the aimer light irradiation unit 3 to emit the aimer light L. When the second switch 2 is actuated, the control unit 7 causes the imaging unit 4 to capture an image.

With the aforementioned configuration, when the push button 6 is pressed to reach the first pressing amount, the aimer light L is irradiated. Then, when the push button 6 is further pressed to reach the second pressing amount, imaging is performed. Therefore, the optical information reading device 100 can intuitively perform the irradiation of the aimer light L and the subsequent imaging.

The aimer light L is light for aiming, and may also be called an aimer, aiming, or aiming light.

The details of the optical information reading device 100 will be described below with reference to FIG. 1.

As shown in FIG. 1, the optical information reading device 100 further includes a housing 8. The housing 8 has the aimer light irradiation unit 3, the imaging unit 4, the first switch 1, and the second switch 2 arranged inside. The housing 8 has a light-transmitting part 9. The light-transmitting part 9 allows the aimer light L from the aimer light irradiation unit 3 to pass from the inside to the outside of the housing 8.

The first switch 1 and the second switch 2 are farther from the light-transmitting part 9 than the aimer light irradiation unit 3 and the imaging unit 4. In other words, the aimer light irradiation unit 3 and the imaging unit 4 are closer to the light-transmitting part 9 than the first switch 1 and the second switch 2.

Since the aimer light irradiation unit 3 and the imaging unit 4 are closer to the light-transmitting part 9 than the first switch 1 and the second switch 2, the aimer light L from the aimer light irradiation unit 3 and the imaging by the imaging unit 4 are not obstructed by the first switch 1 and the second switch 2. Therefore, the optical information reading device 100 can perform the irradiation of the aimer light L and the subsequent imaging with high precision.

The housing 8 may also have the reading unit 5 and the control unit 7 arranged inside. The reading unit 5 and the control unit 7 are also arranged in positions that do not obstruct the aimer light L from the aimer light irradiation unit 3 and the imaging by the imaging unit 4.

The light-transmitting part 9 is not particularly limited as long as it transmits light. The light-transmitting part 9 is, for example, an opening formed in the housing 8.

The optical information reading device 100 may include a grip portion 30 (also called a grip) provided on the housing 8, and a trigger 6 provided on the grip portion 30. The housing 8 may have a key arrangement part 12. The push button 6 is, for example, the trigger 6 or a key arranged on the key arrangement part 12.

The following describes the mechanism for actuating the first switch 1 and the second switch 2 by the force with which the push button 6 is pressed, with reference to FIG. 1 and FIGS. 2A to 2C.

Figure 2A:
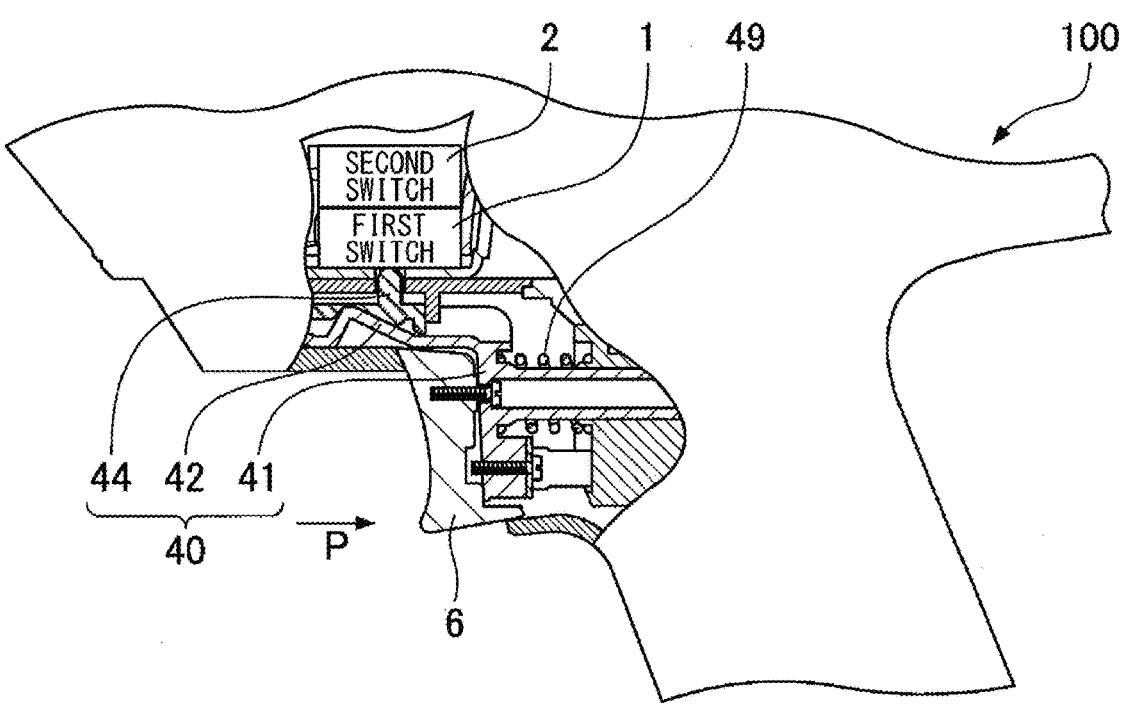
FIG. 2A is a partial cutaway view showing the state before the push button is pressed by the first pressing amount.
Figure 2B:
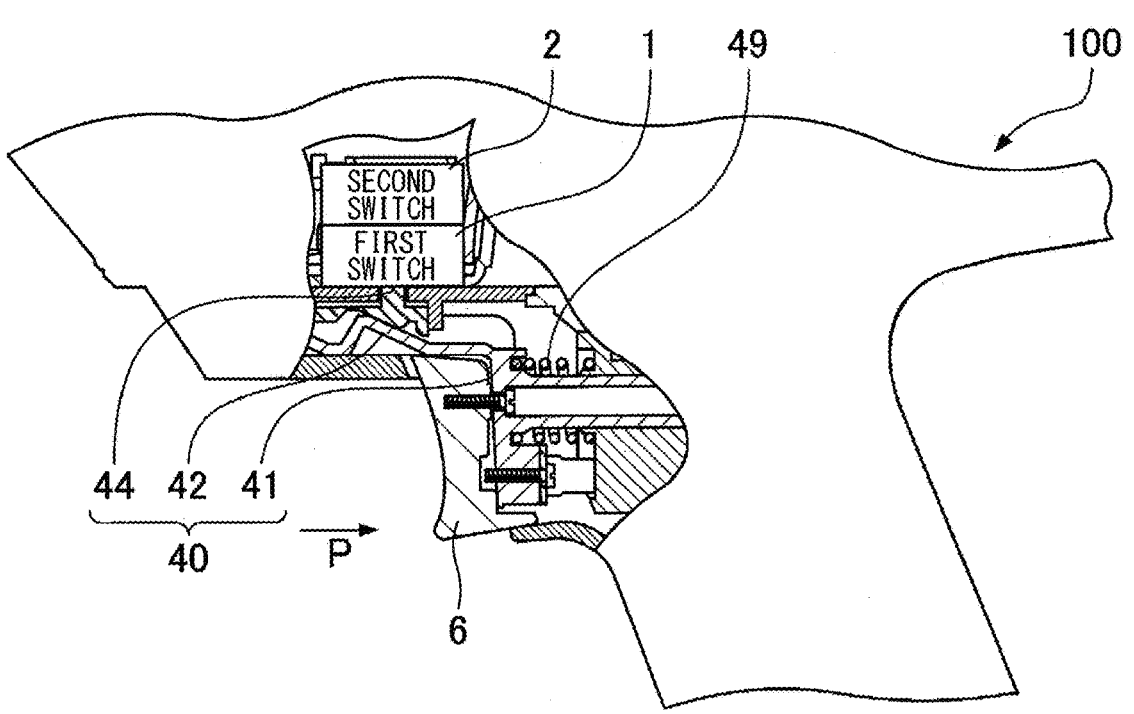
FIG. 2B is a partial cutaway view showing the state when the push button is pressed by the first pressing amount.
Figure 2C:
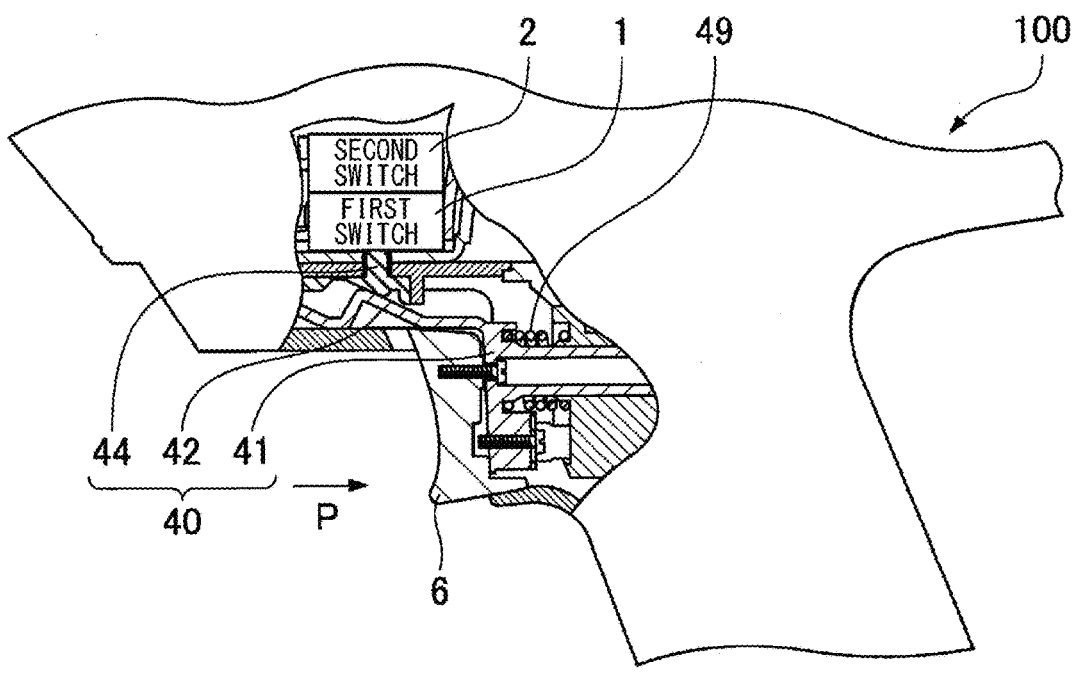
FIG. 2C is a partial cutaway view showing the state when the push button is pressed by the second pressing amount.

FIG. 2A is a partial cutaway view showing the state before the push button 6 is pressed by the first pressing amount. FIG. 2B is a partial cutaway view showing the state when the push button 6 is pressed by the first pressing amount. FIG. 2C is a partial cutaway view showing the state when the push button 6 is pressed by the second pressing amount.

As shown in FIG. 1, the optical information reading device 100 further includes a force transmission member 40. The force transmission member 40 is a member that transmits the force with which the push button 6 is pressed as a force for actuating the first switch 1 and the second switch 2 to the first switch 1 and the second switch 2. The force required to turn on the first switch 1 and the second switch 2 is called the operating force.

As shown in FIG. 2A, the force transmission member 40 includes, as an example, a trigger lever 41, a linear cam 42, and a pusher 44.

The trigger lever 41 is connected to the push button 6 and can move in the pressing direction P and the opposite direction together with the push button 6. The trigger lever 41 is biased in the direction opposite to the pressing direction P by the spring 49.

The linear cam 42 is connected to the trigger lever 41 and can move in the pressing direction P and its opposite direction together with the push button 6 and the trigger lever 41. The linear cam 42 has a cam surface facing the first switch 1 and the second switch 2. The cam surface is inclined so that it approaches the first switch 1 and the second switch 2 more on the side opposite to the pressing direction P.

The pusher 44 is arranged such that its movement in the pressing direction P and the opposite direction is restricted, while it is free to move towards and away from the first switch 1 and the second switch 2. The pusher 44 constitutes the follower of the linear cam 42. In other words, the pusher 44 extends and retracts with respect to the first switch 1 and the second switch 2 by following the cam surface of the linear cam 42.

As shown in FIG. 2A, when the push button 6 is not pressed to the first pressing amount, the pusher 44 does not protrude enough to actuate the first switch 1 and the second switch 2.

As shown in FIG. 2B, when the push button 6 is pressed to the first pressing amount, the trigger lever 41 and the linear cam 42 also move in the pressing direction P by the first pressing amount. Due to the movement of the linear cam 42, the pusher 44 protrudes along the cam surface toward the first switch 1 and the second switch 2. This protrusion causes the pusher 44 to actuate the first switch 1.

As shown in FIG. 2C, when the push button 6 is pressed to the second pressing amount, the trigger lever 41 and the linear cam 42 also move in the pressing direction P by the second pressing amount. Due to the movement of the linear cam 42, the pusher 44 further protrudes along the cam surface towards the first switch 1 and the second switch 2. This protrusion causes the pusher 44 to actuate the second switch 2. It should be noted that when the first switch 1 and the second switch 2 are arranged adjacent to the push button 6, the example is not limited to that shown in FIGS. 2A to 2C, and the force transmission member 40 may be provided adjacent to the pressing direction P side of the push button 6, or may be integrally formed with the push button 6.

The following describes the details of the first switch 1 and the second switch 2. First, referring to FIGS. 3A to 3C, a case where the first switch 1 and the second switch 2 are one tactile switch is explained.

Figure 3A:
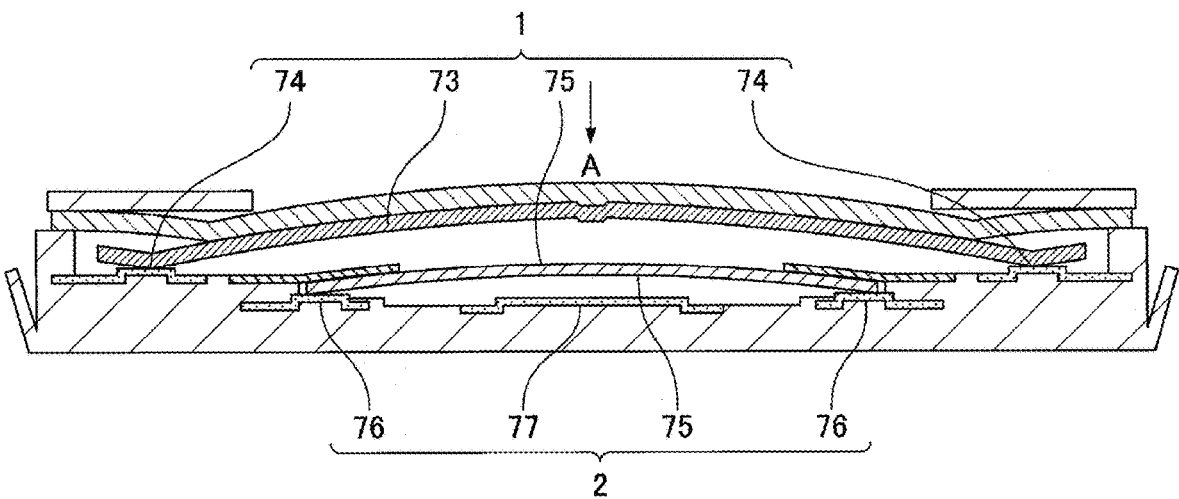
FIG. 3A is a cross-sectional view of a tactile switch where neither the first switch nor the second switch is actuated.
Figure 3B:
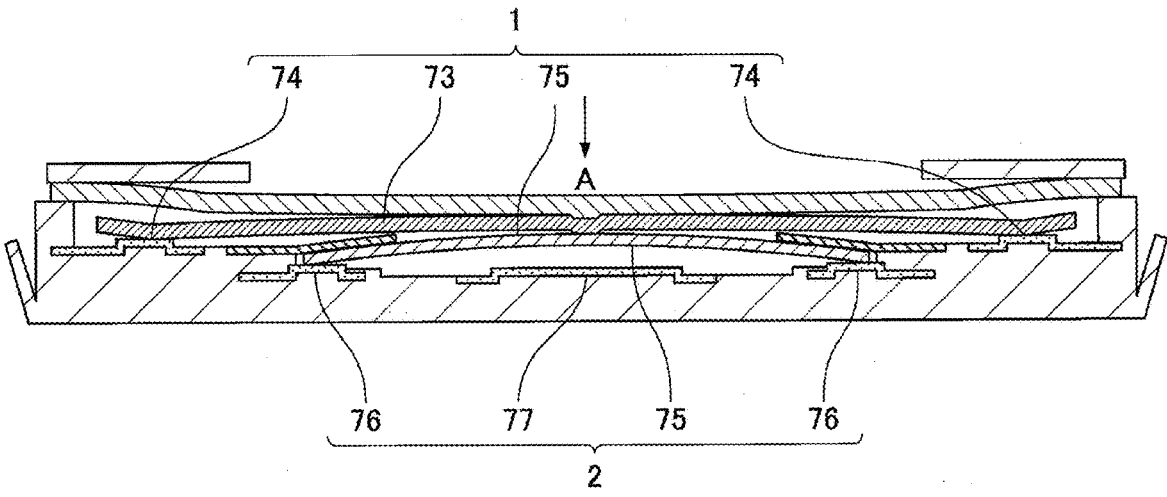
FIG. 3B is a cross-sectional view of a tactile switch where the first switch is actuated.
Figure 3C:
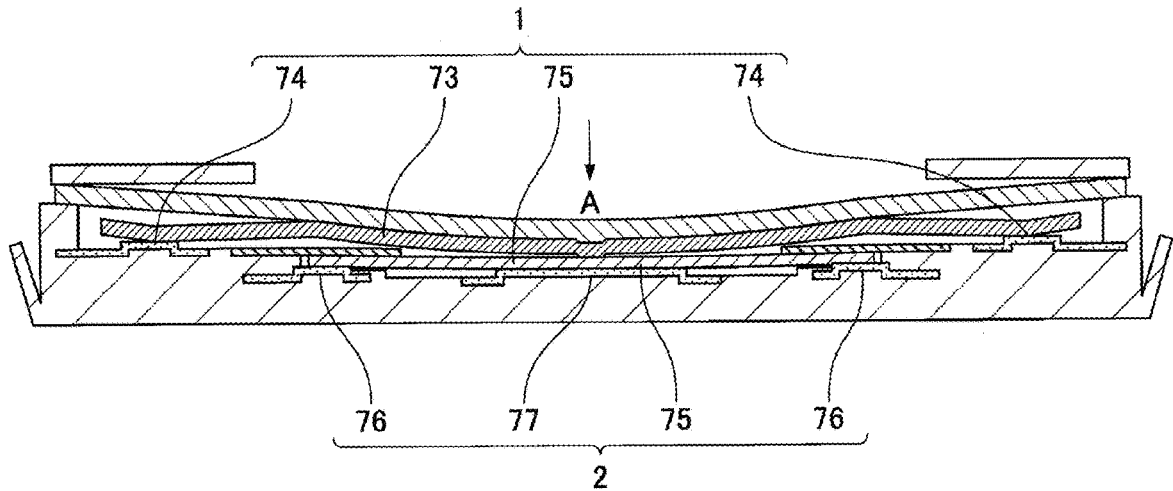
FIG. 3C is a cross-sectional view of a tactile switch where the second switch is actuated.

FIG. 3A is a cross-sectional view of the tactile switch when neither the first switch 1 nor the second switch 2 is actuated. FIG. 3B is a cross-sectional view of the tactile switch when the first switch 1 is actuated. FIG. 3C is a cross-sectional view of the tactile switch when the second switch 2 is actuated.

As shown in FIG. 3A, one tactile switch has a first metal dome 73, a first fixed contact 74, a second metal dome 75, a second fixed contact 76, and a third fixed contact 77.

The first metal dome 73 is electrically connected to the first fixed contact 74. The first metal dome 73 is not electrically connected to the second metal dome 75 when not pressed.

The second metal dome 75 is electrically connected to the second fixed contact 76. The second metal dome 75 is not electrically connected to the third fixed contact 77 when not pressed.

As shown in FIG. 3B, when the first metal dome 73 is pressed, it is electrically connected to the second metal dome 75. Therefore, the first metal dome 73, the first fixed contact 74, and the second metal dome 75 constitute the first switch 1.

As shown in FIG. 3C, when the first metal dome 73 is further pressed, it causes the second metal dome 75 to electrically connect to the third fixed contact 77. Therefore, the second metal dome 75, the second fixed contact 76, and the third fixed contact 77 constitute the second switch 2.

The first switch 1 and the second switch 2 of the tactile switch shown in FIGS. 3A to 3C have a common operation direction A, which is the direction in which they are actuated. Similarly, the first switch 1 and the second switch 2 shown in FIGS. 4 to 8B, which will be described later, also have a common operation direction A, which is the direction in which they are actuated.

Since the operation direction A is common, the force from pressing the push button 6 can be appropriately transmitted to the force that actuates the first switch 1 and the second switch 2. Therefore, the optical information reading device 100 can perform the irradiation of the aimer light L and the subsequent imaging with high precision.

Figure 4:
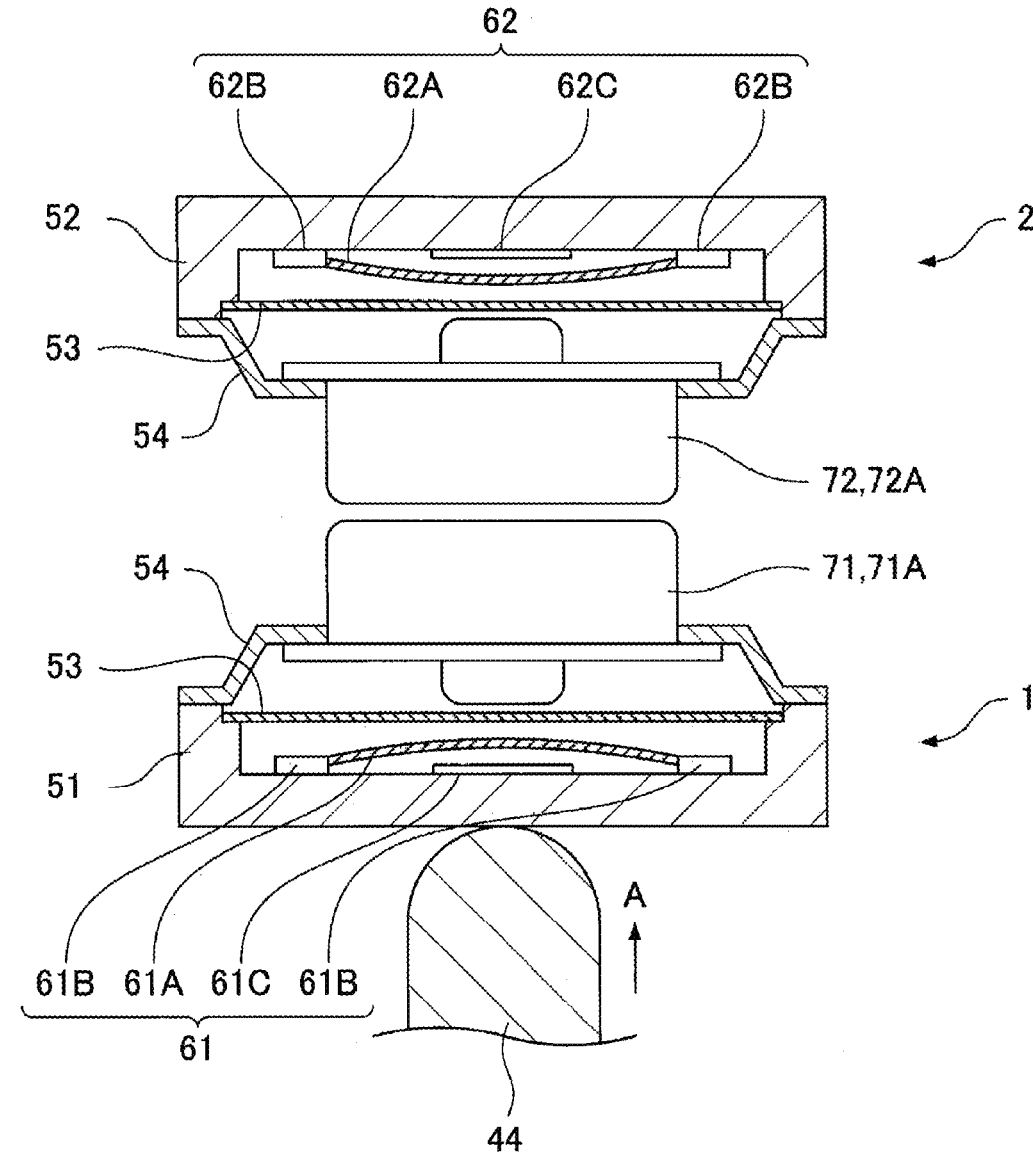
FIG. 4 is a cross-sectional view of the first switch and the second switch arranged in series.
Figure 5:
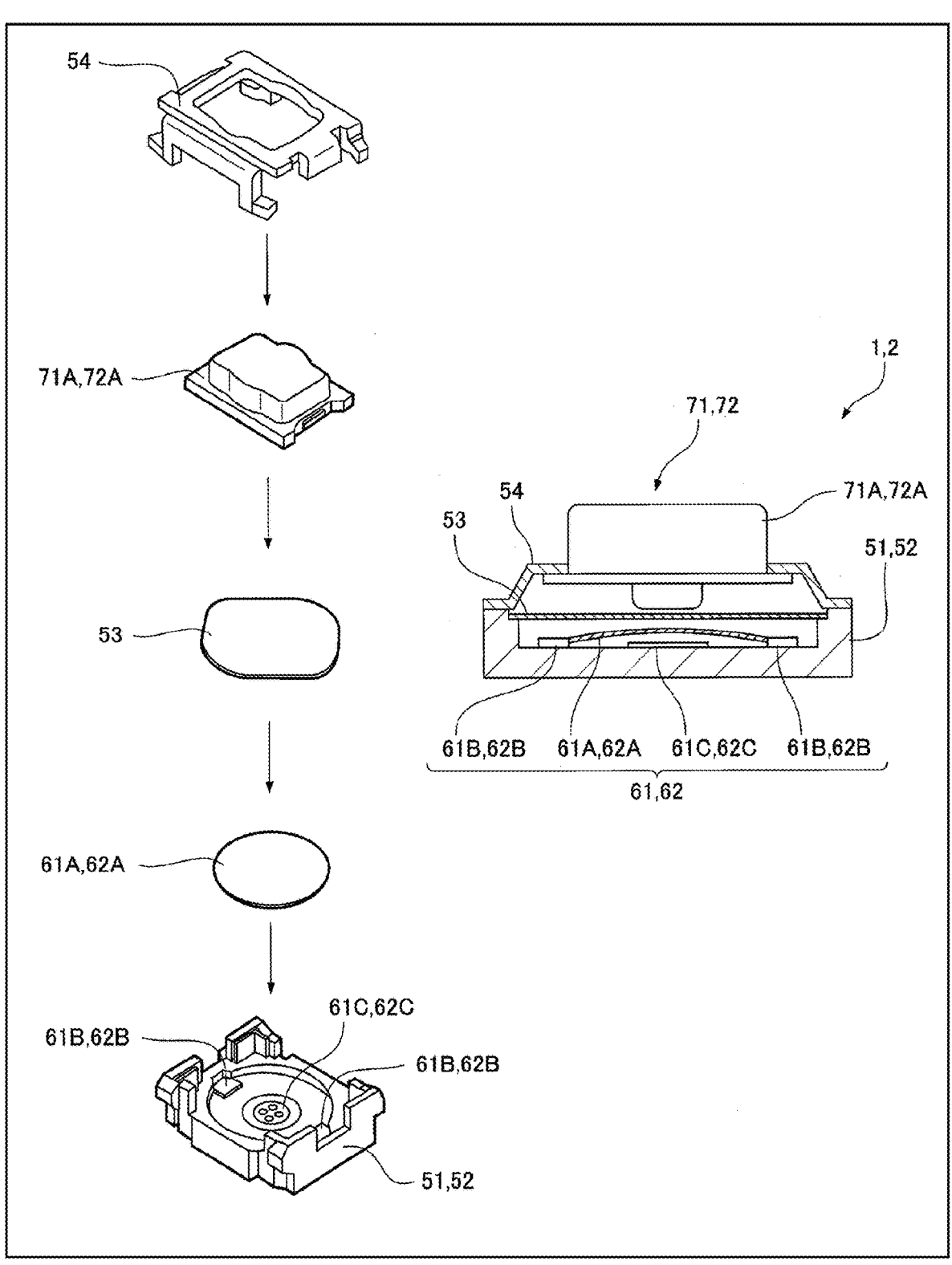
FIG. 5 is an exploded perspective view (left figure) and a cross-sectional view (right figure) of the first switch or the second switch.

Next, referring to FIG. 4 and FIG. 5, a preferred example of the first switch 1 and the second switch 2 will be explained. FIG. 4 is a cross-sectional view of the first switch 1 and the second switch 2 arranged in series. FIG. 5 is an exploded perspective view (left figure) and a cross-sectional view (right figure) of the first switch 1 or the second switch 2.

As shown in FIG. 4, the first switch 1 and the second switch 2 are independent switches. Therefore, the first switch 1 and the second switch 2 each have high durability. As a result, the optical information reading device 100, having independent switches with high durability, can suppress the occurrence of failures even with high frequency of use.

The optical information reading device 100, such as a handheld terminal, has its switch pressed at a far higher frequency than devices equipped with tactile switches (such as digital cameras). Therefore, the optical information reading device 100 requires higher durability than digital cameras and the like. Consequently, the optical information reading device 100 can meet the required high durability by having the first switch 1 and the second switch 2, which are independent of each other, instead of a tactile switch.

As shown in FIG. 4, the first switch 1 and the second switch 2 are arranged in series along the operation direction A, which is the direction for actuating them. Therefore, when either the first switch 1 or the second switch 2 is pressed in the operation direction A, they operate according to the amount of pressure applied to each. As a result, the optical information reading device 100 can be miniaturized because the mechanism for actuating the first switch 1 and the second switch 2 becomes simple.

The operating force of the first switch 1 is smaller than the operating force of the second switch 2. Therefore, when the first switch 1 and the second switch 2, which are arranged in series, are pressed by the pusher 44, the first switch 1 operates first, and then the second switch 2 operates later.

The point at which the first switch 1 operates, that is, the point at which the force pressing the first switch 1 reaches the operating force of the first switch 1, is the point at which the push button 6 is pressed by the first pressing amount. Also, the point at which the second switch 2 operates, that is, the point at which the force pressing the second switch 2 reaches the operating force of the second switch 2, is the point at which the push button 6 is pressed by the second pressing amount.

As shown in FIG. 4 and FIG. 5, the first switch 1 has a first circuit board 61 and a first movable part 71. The first circuit board 61 actuates the first switch 1 by conducting. The first movable part 71 causes the first circuit board 61 to conduct by moving in the operation direction A.

The second switch 2 has a second circuit board 62 and a second movable part 72. The second circuit board 62 actuates the second switch 2 by conducting. The second movable part 72 causes the second circuit board 62 to conduct by moving in the operation direction A. The first movable part 71 and the second movable part 72 face each other.

With the above-mentioned configuration, the first switch 1 and the second switch 2 have a simplified arrangement. Therefore, the optical information reading device 100 can be miniaturized with the simplified arrangement of the first switch 1 and the second switch 2.

As shown in FIG. 5, the first switch 1 and the second switch 2 each have a mounting base 51, 52, a metal dome 61A, 62A, a peripheral fixed contact 61B, 62B, a central fixed contact 61C, 62C, a cover plate 54, a push plate 71A, 72A, and a film 53. The mounting bases 51, 52 are where the metal domes 61A, 62A, peripheral fixed contacts 61B, 62B, central fixed contacts 61C, 62C, film 53, and cover plate 54 are arranged.

The metal domes 61A, 62A are electrically connected to the peripheral fixed contacts 61B, 62B. When not pressed, the metal domes 61A, 62A are not electrically connected to the central fixed contacts 61C, 62C. When pressed, the metal domes 61A, 62A deform and become electrically connected to the central fixed contacts 61C, 62C.

The cover plate 54 holds the push plates 71A, 72A at the center. When pressed, the push plates 71A, 72A deform and press the metal domes 61A, 62A through the film 53.

The metal dome 61A, peripheral fixed contact 61B, and central fixed contact 61C of the first switch 1 constitute the first circuit board 61. The conductive state of the first circuit board 61 refers to the state in the first switch 1 where the metal dome 61A is also electrically connected to the central fixed contact 61C. The push plate 71A of the first switch 1 constitutes the first movable part 71.

The metal dome 62A, peripheral fixed contact 62B, and central fixed contact 62C of the second switch 2 constitute the second circuit board 62. The conductive state of the second circuit board 62 refers to the state in which the metal dome 62A is also electrically connected to the central fixed contact 62C in the second switch 2. The push plate 72A of the second switch 2 constitutes the second movable part 72.

Figure 6:
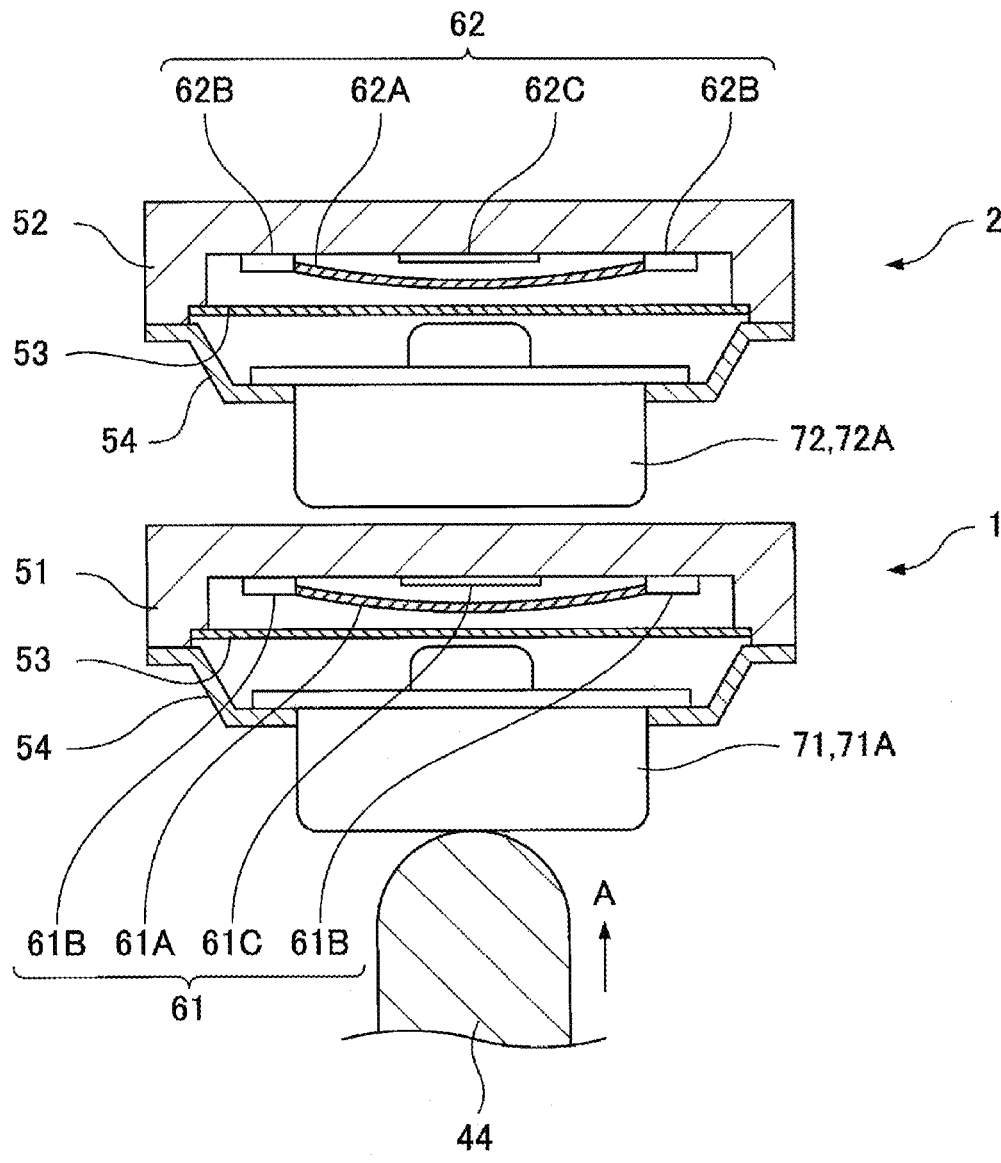
FIG. 6 is another example of a cross-sectional view of the first switch and the second switch arranged in series.
Figure 7:
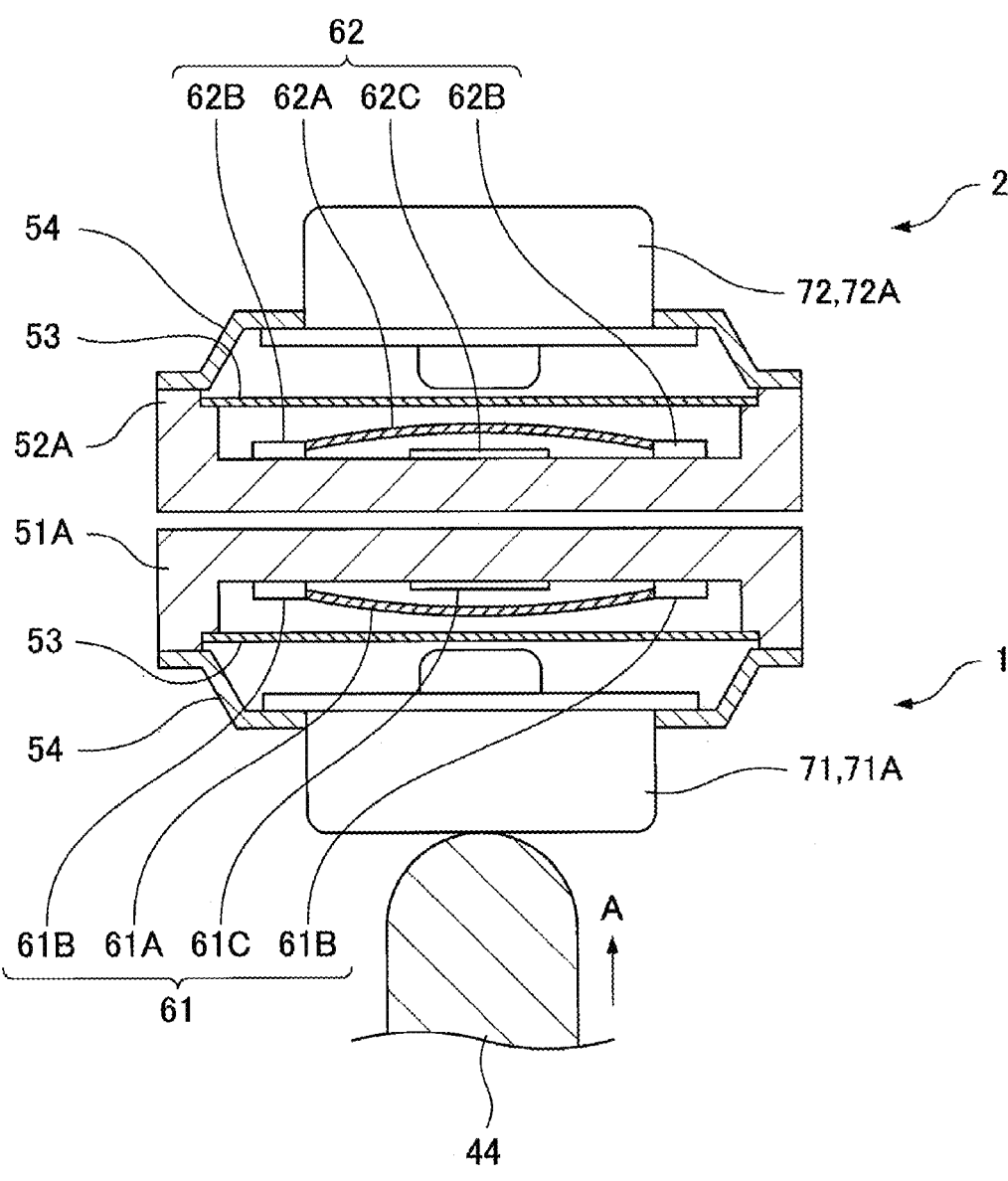
FIG. 7 is yet another example of a cross-sectional view of the first switch and the second switch arranged in series.

Next, referring to FIG. 6 and FIG. 7, another example of the first switch 1 and the second switch 2 arranged in series will be explained. FIG. 6 is a cross-sectional view of another example of the first switch 1 and the second switch 2 arranged in series. FIG. 7 is a cross-sectional view of yet another example of the first switch 1 and the second switch 2 arranged in series.

As shown in FIG. 6, the mounting base 51 of the first switch 1 and the push plate 72A of the second switch 2 face each other. The push plate 71A of the first switch 1 can be pressed by the pusher 44. The arrangement may be such that the first switch 1 and the second switch 2 shown in FIG. 6 are interchanged. In other words, although not shown, the arrangement may be such that the push plate 71A of the first switch 1 and the mounting base 52 of the second switch 2 face each other, and the push plate 72A of the second switch 2 can be pressed by the pusher 44.

As shown in FIG. 7, the mounting base 51 of the first switch 1 and the mounting base 52 of the second switch 2 face each other. The push plate 71A of the first switch 1 can be pressed by the pusher 44. The arrangement may be such that the first switch 1 and the second switch 2 shown in FIG. 7 are interchanged. In other words, although not shown, the arrangement may be such that the push plate 72A of the second switch 2 can be pressed by the pusher 44.

With the configuration shown in FIGS. 6 and 7, similar to the configuration shown in FIG. 4, the first switch 1 and the second switch 2 have a simplified arrangement. Therefore, the optical information reading device 100 can be miniaturized with the simplified arrangement of the first switch 1 and the second switch 2.

In the examples shown in FIG. 4, FIG. 6, and FIG. 7, the first switch 1 and the second switch 2 are both arranged in series. In the example shown in FIG. 4, the first switch 1 and the second switch 2 do not require as high precision for the mounting bases 51, 52 compared to the first switch 1 and second switch 2 in the examples shown in FIG. 6 and FIG. 7, making manufacturing easier.

Figure 8A:
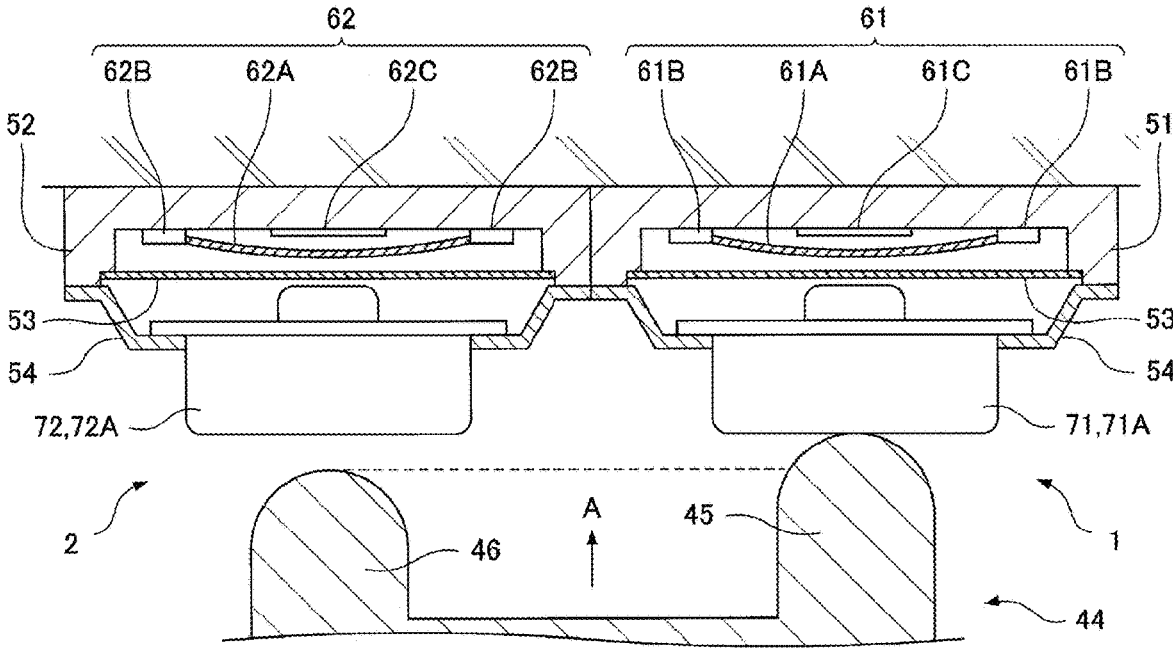
FIG. 8A is a cross-sectional view of the first switch and the second switch arranged in parallel.
Figure 8B:
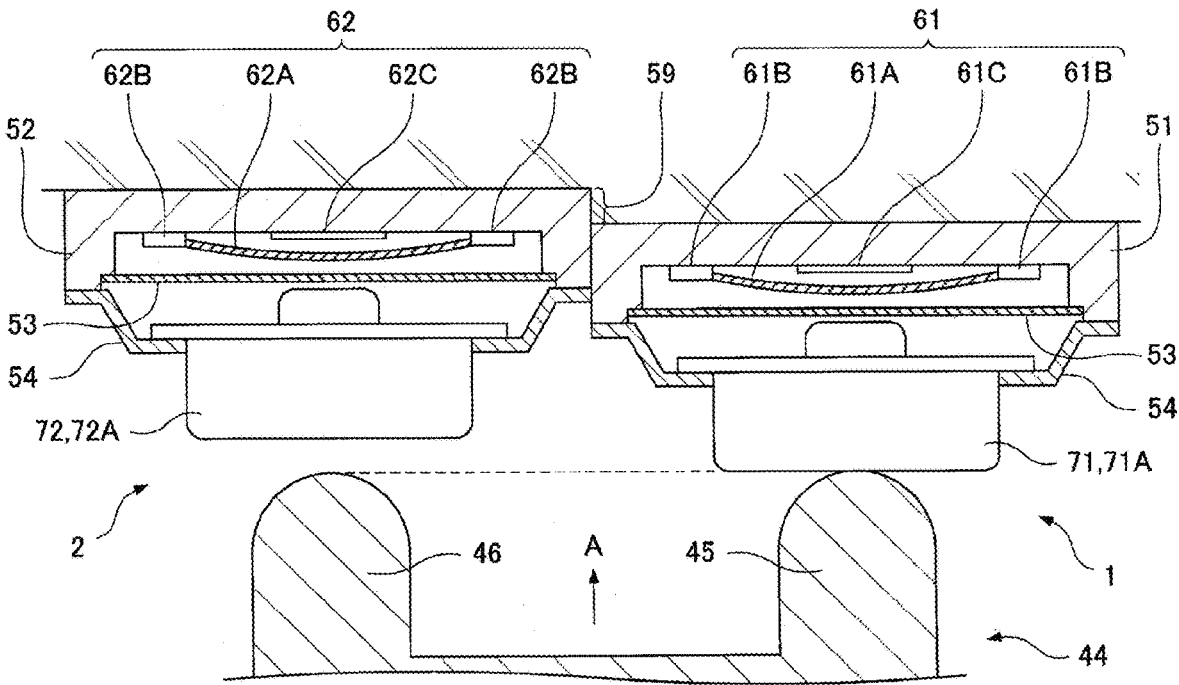
FIG. 8B is another example of a cross-sectional view of the first switch and the second switch arranged in parallel.

Next, referring to FIG. 8A and FIG. 8B, the first switch 1 and the second switch 2 arranged in parallel will be explained. FIG. 8A is a cross-sectional view of the first switch 1 and the second switch 2 arranged in parallel. FIG. 8B is a cross-sectional view of another example of the first switch 1 and the second switch 2 arranged in parallel.

As shown in FIGS. 8A and 8B, the first switch 1 and the second switch 2 are arranged in parallel in a direction perpendicular to the operation direction A. Therefore, the first switch 1 and the second switch 2 can be made thinner. As a result, the optical information reading device 100 can be miniaturized by the first switch 1 and the second switch 2 which can be made thinner.

When the first switch 1 and the second switch 2 are arranged in parallel, the pusher 44 has a first pressing part 45 that presses the first switch 1 and a second pressing part 46 that presses the second switch 2. The pusher 44 is configured so that the first pressing part 45 presses the first movable part 71 first, and the second pressing part 46 presses the second movable part 72 later. In other words, the distance between the second pressing part 46 and the second movable part 72 is longer than the distance between the first pressing part 45 and the first movable part 71.

Specifically, as shown in FIG. 8A, the first switch 1 and the second switch 2 are arranged on a common surface, and the second pressing part 46 is shorter than the first pressing part 45. Alternatively, as shown in FIG. 8B, the surface on which the first switch 1 is arranged protrudes 59 towards the pusher 44 side more than the surface on which the second switch 2 is arranged, and the lengths of the first pressing part 45 and the second pressing part 46 are the same. With the configurations of FIG. 8A and FIG. 8B, for example, even if the first switch 1 and the second switch 2 are switches of the same type and the operating forces of the first switch 1 and the second switch 2 are the same, the first switch 1 operates first, and the second switch 2 operates later. Furthermore, by supporting the mounting base 51 of the first switch 1, which operates first, with an elastic member having a stronger repulsive force than the metal dome 61A, it is possible to reduce the possibility of the first switch 1 being damaged by the additional force applied to the first switch 1 during the period until the second switch 2 operates.

Of course, when the first switch 1 and the second switch 2 are arranged in parallel, it is not limited to the examples shown in FIG. 8A and FIG. 8B, and it is sufficient that the first switch 1 operates at the first pressing amount and the second switch 2 operates at the second pressing amount. For example, when the operating force of the first switch 1 is smaller than the operating force of the second switch 2, even if the first switch 1 and the second switch 2 are arranged on the same surface and the lengths of the first pressing part 45 and the second pressing part 46 of the pusher 44 are the same, the first switch 1 operates first, and the second switch 2 operates later.

When the first switch 1 and the second switch 2 are arranged in parallel, the difference between the first pressing amount and the second pressing amount can be easily increased. Specifically, the distance between the second pressing part 46 and the second movable part 72 should be made longer than the distance between the first pressing part 45 and the first movable part 71. By varying at least one of the operating force required for the first switch 1 and the second switch 2, and the timing at which the pressing force is transmitted to the first switch 1 and the second switch 2 via the force transmission member 40, the second switch 2 is actuated after the first switch 1 has been actuated.

The following describes a mechanism for providing tactile feedback to the user when the push button 6 is pressed to the first pressing amount, with reference to FIG. 9 and FIGS. 10A to 10C.

Figure 9:
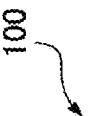
FIG. 9 is a partial cutaway view showing a tactile feedback mechanism.
Figure 10A:
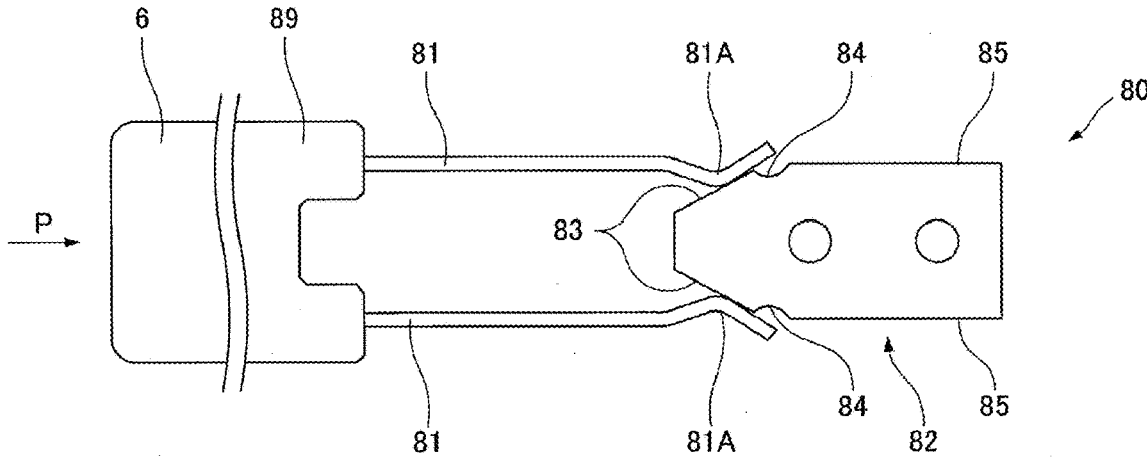
FIG. 10A is an X-X cross-sectional view of FIG. 9, showing the state before the push button is pressed by the first pressing amount.
Figure 10B:
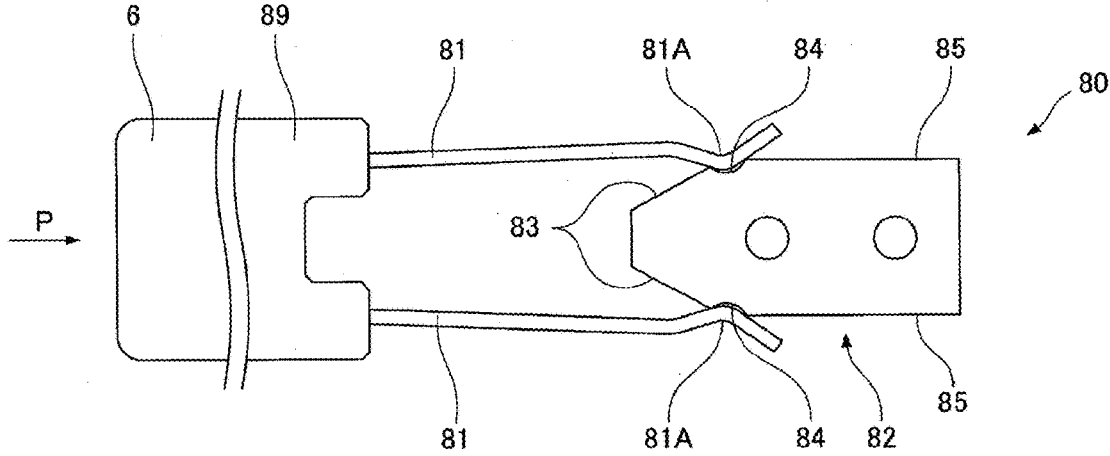
FIG. 10B is an X-X cross-sectional view of FIG. 9, showing the state when the push button is pressed by the first pressing amount.
Figure 10C:
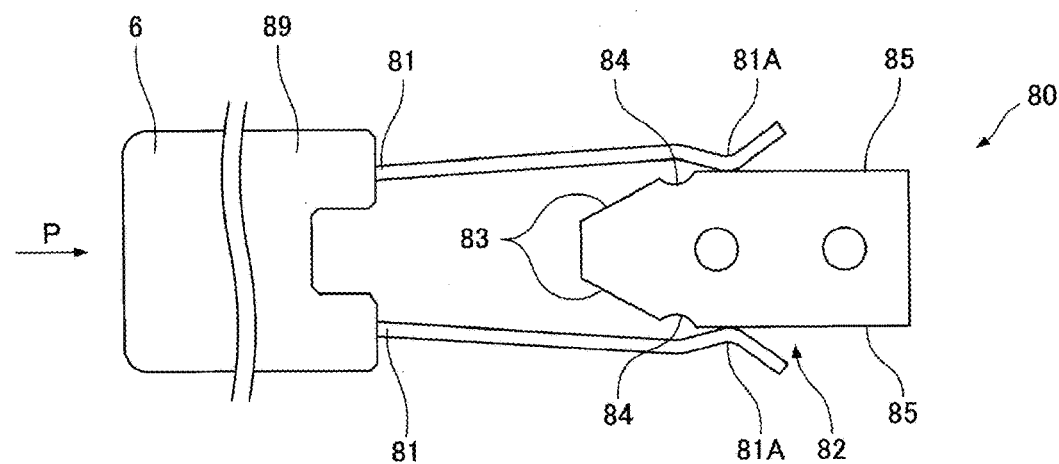
FIG. 10C is an X-X cross-sectional view of FIG. 9, showing the state when the push button is pressed by the second pressing amount.

FIG. 9 is a partial cutaway view showing the tactile feedback mechanism 80. FIG. 10A is a cross-sectional view along X-X in FIG. 9, showing the state before the push button 6 is pressed by the first pressing amount. FIG. 10B is a cross-sectional view along X-X in FIG. 9, showing the state where the push button 6 is pressed by the first pressing amount. FIG. 10C is a cross-sectional view along X-X in FIG. 9, showing the state where the push button 6 is pressed by the second pressing amount.

As shown in FIG. 9, the optical information reading device 100 further includes a tactile feedback mechanism 80. The tactile feedback mechanism 80 is connected to the push button 6. The tactile feedback mechanism 80 may be indirectly connected to the push button 6 (via the trigger lever 41, etc.), or may be directly connected to the push button 6, although not shown.

As shown in FIGS. 10A to 10C, the tactile feedback mechanism 80 has a first member 81 and a second member 82. The first member 81 and the second member 82 can fit together. The first member 81 and the second member 82 fit together when the push button 6 is pressed with a first pressing amount.

When the push button 6 is pressed with the first pressing amount, the first member 81 and the second member 82 fit together, and the tactile feedback due to the fitting is transmitted to the push button 6. Therefore, the optical information reading device 100 can provide tactile feedback to the user that the push button 6 has been pressed with the first pressing amount by means of the tactile feedback mechanism 80.

The tactile feedback mechanism 80 further includes a plate spring holder 89. The plate spring holder 89 is indirectly or directly connected to the push button 6.

The first member 81 is a pair of leaf springs. The first member 81, which is a pair of leaf springs, is held by the plate spring holder 89. Therefore, when the push button 6 is pressed, the first member 81 moves in the pressing direction P together with the plate spring holder 89. The first member 81 has a double bend portion 81A on each of the pair of leaf springs. These double bend portions 81A are bent to approach each other.

The second member 82 is a block that guides the first member 81, which is a pair of leaf springs. The second member 82 has a widened part 83, a recessed portion 84, and a parallel portion 85. The widened part 83 is a portion that widens towards the pressing direction P. The recessed portion 84 is connected to the widest part of the widened part 83. The parallel portion 85 is connected to the recessed portion 84 on the pressing direction P side.

As shown in FIG. 10A, when the push button 6 is not pressed, or when the push button 6 is pressed but does not reach the first pressing amount, the double bend portion 81A is guided by the widened part 83.

As shown in FIG. 10B, when the push button 6 is pressed to reach the first pressing amount, the double bend portion 81A enters the recessed portion 84 beyond the widened part 83. As the double bend portion 81A enters the recessed portion 84, that is, as the first member 81 and the second member 82 fit together, the impact (tactile feedback) due to the fitting is transmitted to the push button 6 through the plate spring holder 89.

As shown in FIG. 10C, when the push button 6 is further pressed beyond the first pressing amount, the double bend portion 81A escapes from the recessed portion 84 and is guided to the parallel portion 85. Although not shown, a separate recessed portion may be formed in the second member 82 into which the double bend portion 81A enters when the push button 6 is pressed in the pressing direction P by the second pressing amount. When the push button 6 is pressed in the pressing direction P by the second pressing amount, the double bend portion 81A entering the separate recessed portion transmits further tactile feedback to the push button 6.

Next, referring to FIGS. 11A to 11C, a tactile feedback mechanism 80 different from that shown in FIGS. 10A to 10C will be explained.

Figure 11A:
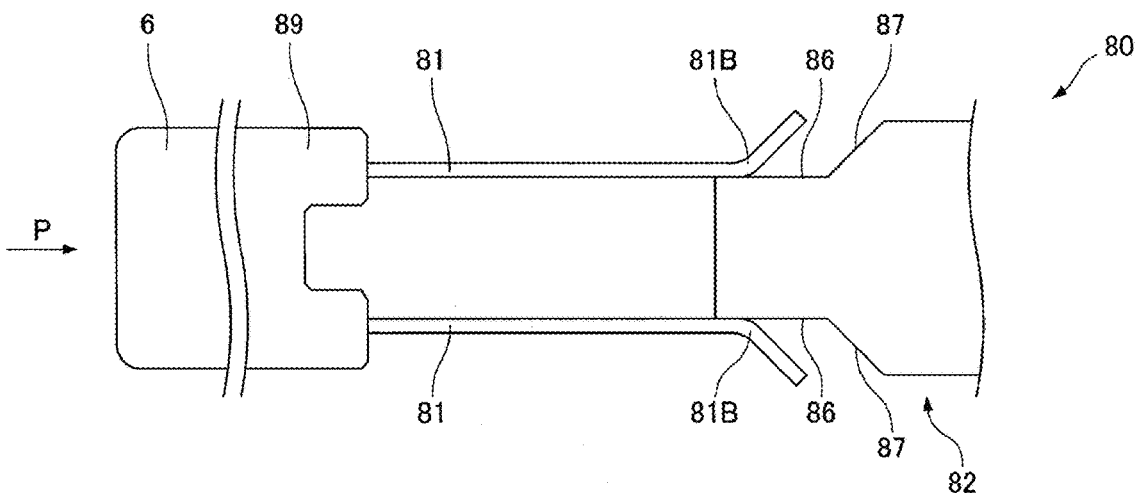
FIG. 11A is a cross-sectional view of another example of the tactile feedback mechanism, corresponding to the state in FIG. 10A.

FIG. 11A is a cross-sectional view of another example of the tactile feedback mechanism 80, showing a state corresponding to FIG. 10A. FIG. 11B is a cross-sectional view of another example of the tactile feedback mechanism 80, showing a state corresponding to FIG. 10B. FIG. 11C is a cross-sectional view of another example of the tactile feedback mechanism 80, showing a state corresponding to FIG. 10C.

As shown in FIG. 11A, the first member 81 has outer bent portions 81B on each of the pair of leaf springs. These outer bent portions 81B are bent so that they are farther apart from each other toward the tips.

The second member 82 has a narrow parallel portion 86 and an inclined portion 87. The narrow parallel portion 86 is positioned on the opposite side of the pressing direction P. The inclined portion 87 is connected to the narrow parallel portion 86 on the pressing direction P side. The surface of the inclined portion 87 is along the surface of the outer bent portion 81B.

As shown in FIG. 11A, when the push button 6 is not pressed, or when the push button 6 is pressed but does not reach the first pressing amount, the outer bent portion 81B is guided by the narrow parallel portion 86.

Figure 11B:
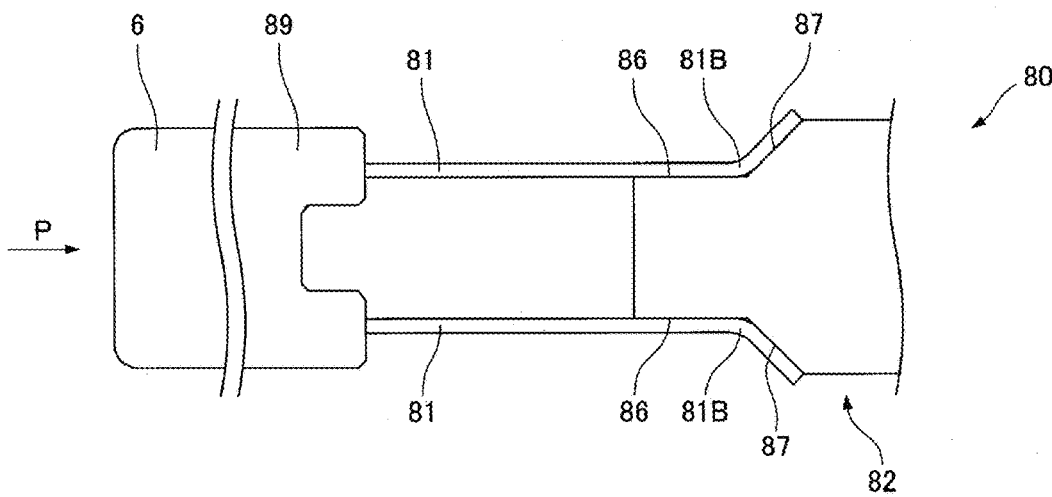
FIG. 11B is a cross-sectional view of another example of the tactile feedback mechanism, corresponding to the state in FIG. 10B.

As shown in FIG. 11B, when the push button 6 is pressed to reach the first pressing amount, the bent portion of the outer bent portion 81B reaches the boundary between the narrow parallel portion 86 and the inclined portion 87, so that the first member 81 and the second member 82 fit together. When the push button 6 is pressed further, the bent portion of the outer bent portion 81B is guided by the inclined portion 87, so the force required to press the push button 6 increases. This increase in force (tactile feedback) is transmitted to the push button 6 through the plate spring holder 89.

Figure 11C:
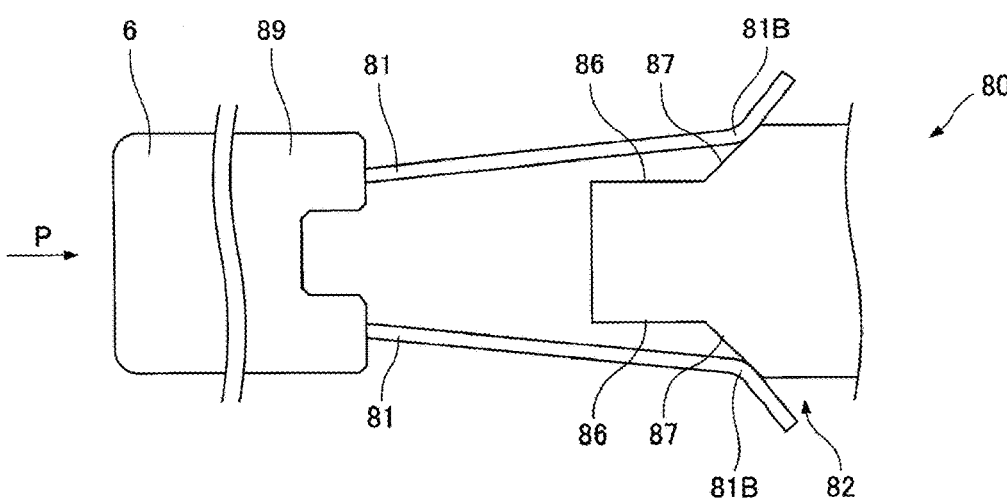
FIG. 11C is a cross-sectional view of another example of the tactile feedback mechanism, corresponding to the state in FIG. 10C.

As shown in FIG. 11C, when the push button 6 is further pressed beyond the first pressing amount, the outer bent portion 81B escapes the boundary and is guided to the inclined portion 87. Therefore, the force required to press the push button 6 beyond the first pressing amount (FIG. 11C) becomes sufficiently larger than the force required to press the push button 6 up to the first pressing amount (FIG. 11A).

Figure 12:
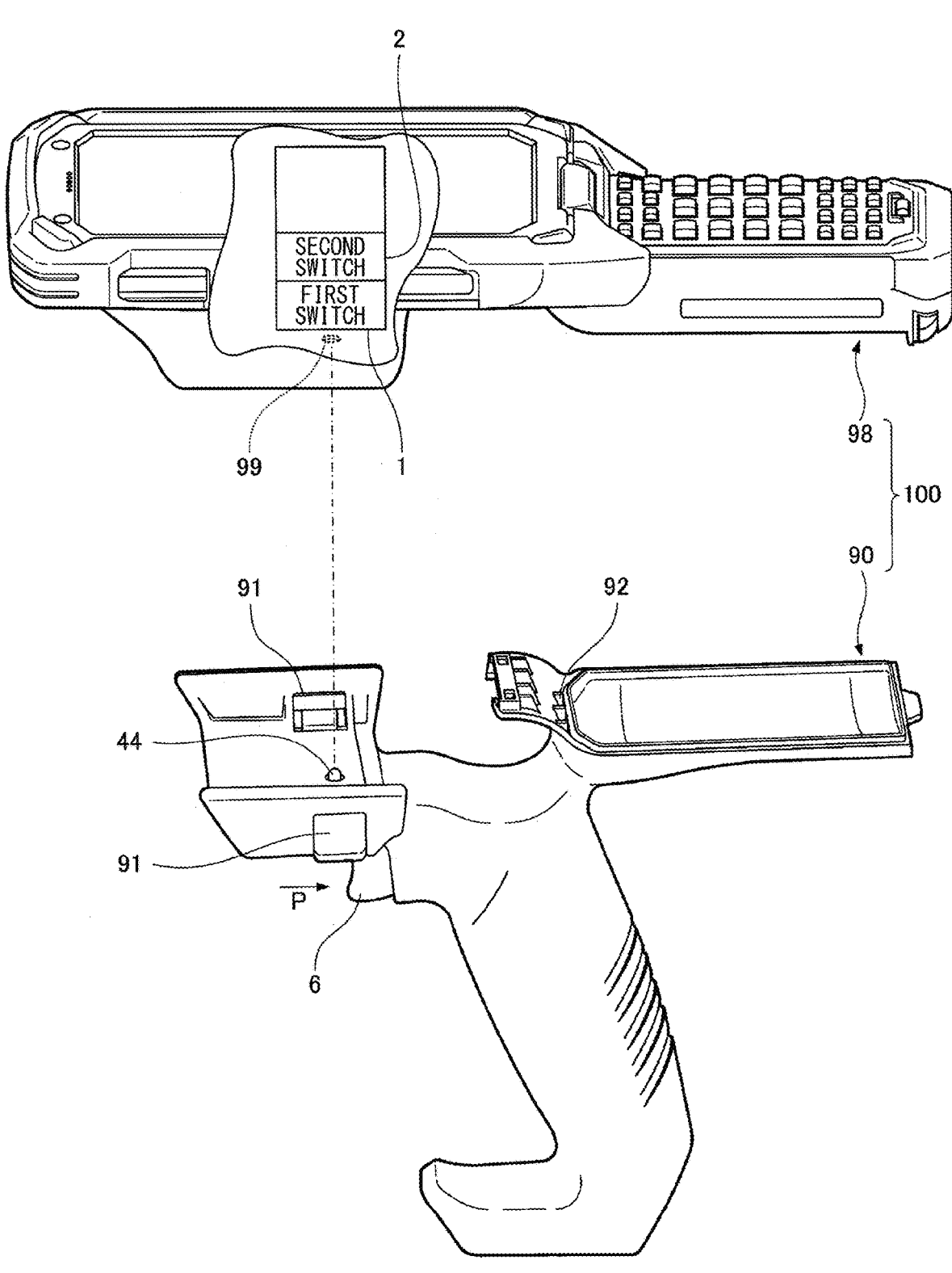
FIG. 12 is an exploded perspective view of an attachment-type optical information reading device viewed from the upper side.

The following describes a case where the optical information reading device 100 is of an attachment type, with reference to FIG. 12. FIG. 12 is an exploded perspective view of the attachment-type optical information reading device 100 viewed from the upper side.

The optical information reading device 100 further includes a main body 98 and a detachable part 90. The detachable part 90 is detachably attachable to the main body 98.

The main body 98 has at least the first switch 1 and the second switch 2 arranged. The main body 98 has a communication hole 99. The communication hole 99 communicates from the outside to the first switch 1 and the second switch 2.

The detachable part 90 is provided with at least the push button 6. The detachable part 90 has a protrusion 44 that protrudes when the push button 6 is pressed in the pressing direction P. The protrusion 44 is, for example, a pusher 44.

When the detachable part 90 is attached to the main body 98 and the push button 6 is pressed in the pressing direction P by the first pressing amount, the protrusion 44 protrudes through the communication hole 99 until it actuates the first switch 1. When the detachable part 90 is attached to the main body 98 and the push button 6 is pressed in the pressing direction P by the second pressing amount, the protrusion 44 protrudes through the communication hole 99 until it actuates the second switch 2.

The optical information reading device 100 includes a main body 98 and a detachable part 90, allowing selection of the main body 98 or the detachable part 90 suitable for use. Additionally, the optical information reading device 100 has components requiring water resistance arranged in the main body 98, thus enabling improved water resistance.

Figure 13:
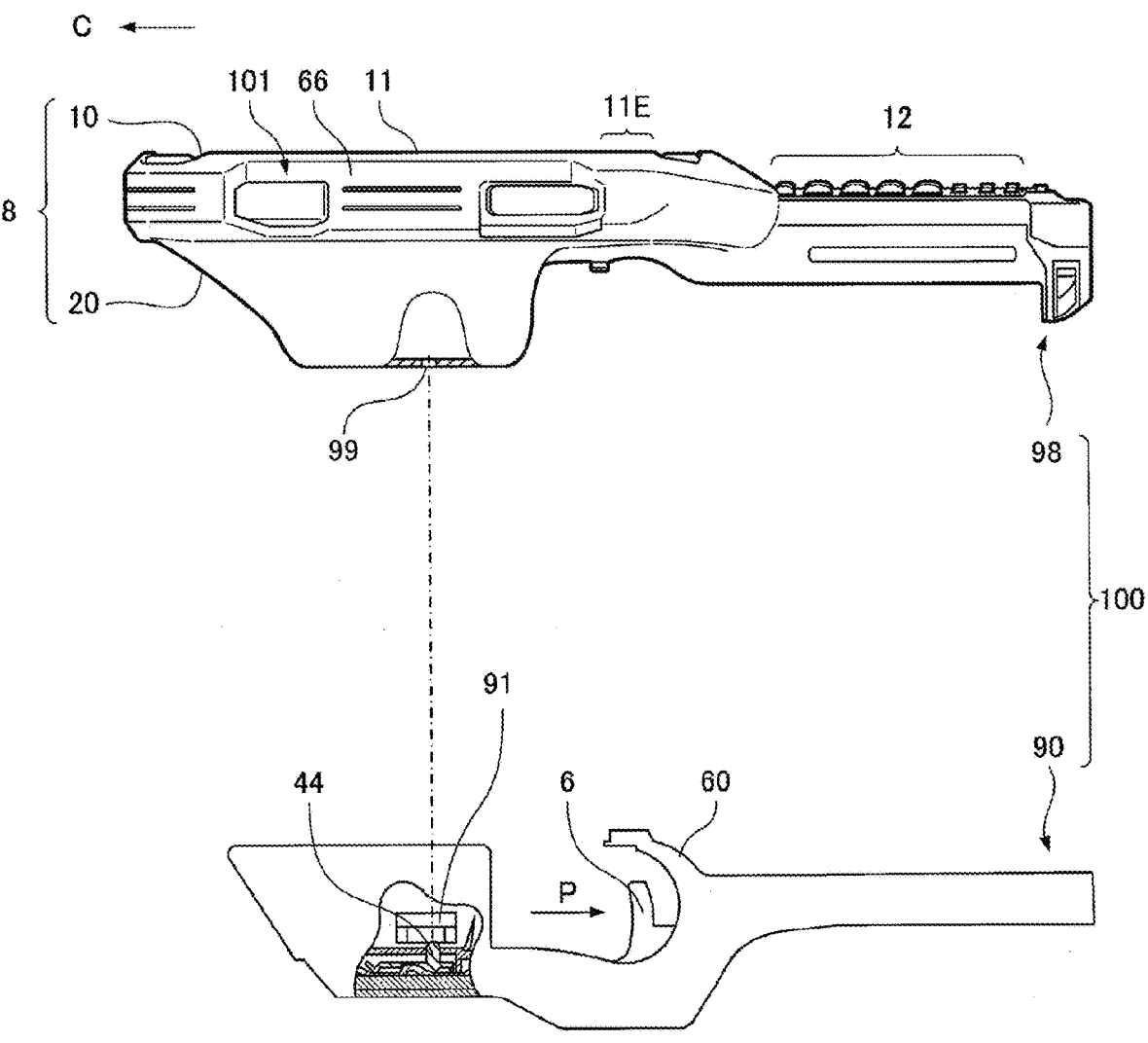
FIG. 13 is an exploded side view of an optical information reading device without a grip portion.

The following describes an optical information reading device 100 without a grip portion 30, with reference to FIG. 13. FIG. 13 is an exploded side view of the optical information reading device 100 without the grip portion 30.

As shown in FIG. 13, the housing 8 has a first main surface 10 and a second main surface 20 which is the opposite surface of the first main surface 10. The first main surface 10 and the second main surface 20 are not necessarily limited to flat surfaces, and may be surfaces with curves or unevenness.

The first main surface 10 has a display unit 11 and a key arrangement part 12. The display unit 11 displays information. The key arrangement part 12 is positioned on the opposite side of the predetermined direction C from the display unit 11.

The second main surface 20 is provided with a push button 6. The push button 6 is a trigger 6 that is pressed in the opposite direction of the predetermined direction C. In the example shown in FIG. 13, the optical information reading device 100 is an attachment type having a main body 98 and a detachable part 90. In the detachable part 90, the side attached to the main body 98 also constitutes the second main surface 20.

The push button 6 is the trigger 6, and there is no grip portion 30, so the area around the key arrangement part 12 becomes the part to be gripped. Therefore, the optical information reading device 100 can eliminate the need for switching from operating the trigger 6 to operating the key arrangement part 12.

As shown in FIG. 13, the optical information reading device 100 further includes a trigger guard 60 around the trigger 6. The trigger guard 60 can be hooked by a finger when operating the key arrangement part 12. Therefore, the optical information reading device 100 can improve operability and portability by including the trigger guard 60.

The optical information reading device 100 shown in FIG. 13 differs from the optical information reading device 100 shown up to FIG. 12 in that it does not have a grip portion 30 and the arrangement of the push button 6, which is the trigger 6, is different. Other than the grip portion 30 and the arrangement of the push button 6, the optical information reading device 100 shown in FIG. 13 is identical to the optical information reading device 100 shown up to FIG. 12.

The optical information reading device 100 shown in FIG. 13 is not limited to the attachment type having a main body 98 and a detachable part 90, but may be an integrated type.

Embodiment 2

Figure 14:
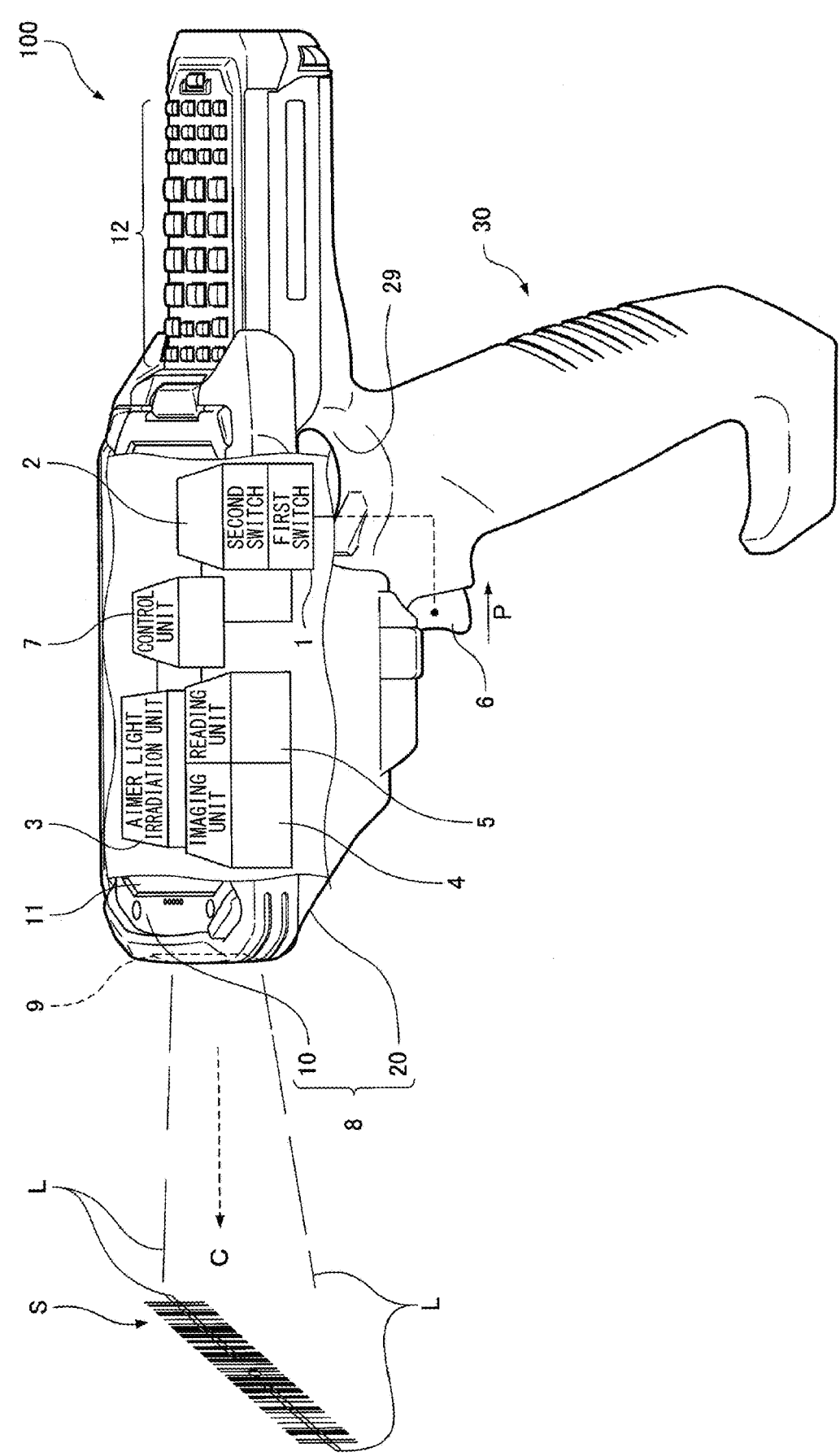
FIG. 14 is a perspective view of an optical information reading device according to Embodiment 2 viewed from the upper side.

The following description will explain the optical information reading device 100 according to embodiment 2 of this disclosure with reference to the drawings. First, referring to FIG. 14, an outline of the optical information reading device 100 according to embodiment 2 will be explained. FIG. 14 is a perspective view of the optical information reading device 100 according to embodiment 2 viewed from the upper side.

As shown in FIG. 14, the optical information reading device 100 is a device that captures an image of a symbol S, which is the reading target, and reads the information of the captured symbol S. The optical information reading device 100 includes an imaging unit 4, a reading unit 5, and a housing 8.

The imaging unit 4 captures images in a predetermined direction C. The reading unit 5 reads information of the symbol S from the image generated by the imaging of the imaging unit 4.

The housing 8 has the imaging unit 4 and the reading unit 5 arranged inside. The housing 8 has a first main surface 10 and a second main surface 20 which is the opposite surface of the first main surface 10.

The first main surface 10 has a display unit 11 and a key arrangement part 12. The display unit 11 displays information. The key arrangement part 12 is positioned on the opposite side of the predetermined direction C from the display unit 11.

The optical information reading device 100 further includes a grip portion 30, a trigger 6, and a finger insertion space 29.

The grip portion 30 is provided on the second main surface 20 on the predetermined direction C side with respect to the key arrangement part 12. The trigger 6 is provided on the grip portion 30. The trigger 6 initiates imaging by the imaging unit 4 when pressed in the pressing direction P, which is opposite to the predetermined direction C. The finger insertion space 29 is formed between the housing 8 and the grip portion 30. The finger insertion space 29 extends in a direction along the display unit 11, intersecting the predetermined direction C.

With the aforementioned configuration, when switching from operating the trigger 6 to operating the key arrangement part 12, a finger is inserted into the finger insertion space 29. Therefore, the optical information reading device 100 can facilitate the switching of grip from operating the trigger 6 to operating the key arrangement part 12.

Next, referring to FIGS. 15A to 15D, the change of grip of the optical information reading device 100 will be specifically explained.

Figure 15A:
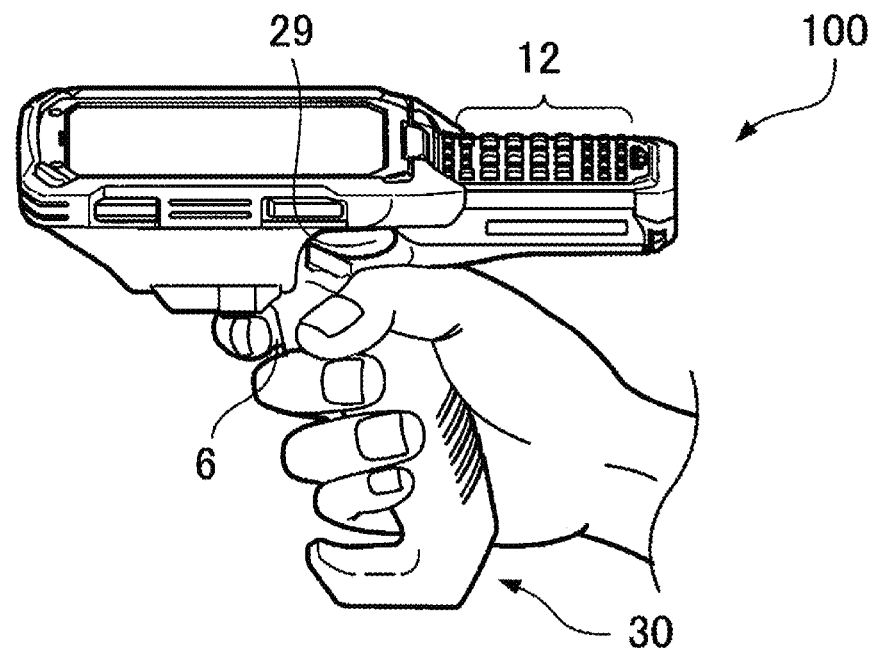
FIG. 15A is a perspective view of the optical information reading device viewed from the upper side, showing the state where the trigger is operated.
Figure 15B:
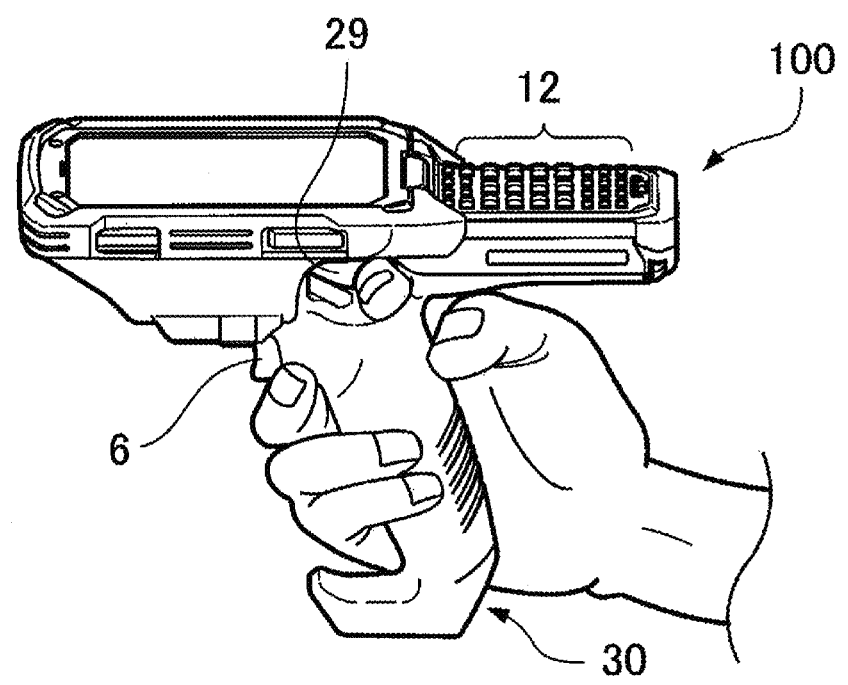
FIG. 15B is a perspective view of the optical information reading device viewed from the upper side, showing the first stage of changing grip from trigger operation to key arrangement part operation.
Figure 15C:
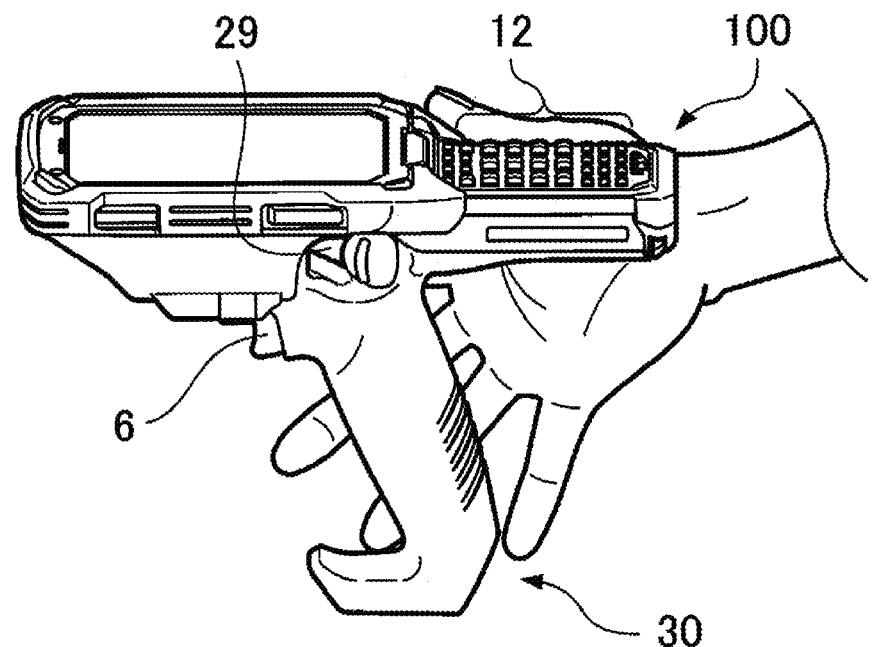
FIG. 15C is a perspective view of the optical information reading device viewed from the upper side, showing the second stage of changing grip from trigger operation to key arrangement part operation.
Figure 15D:
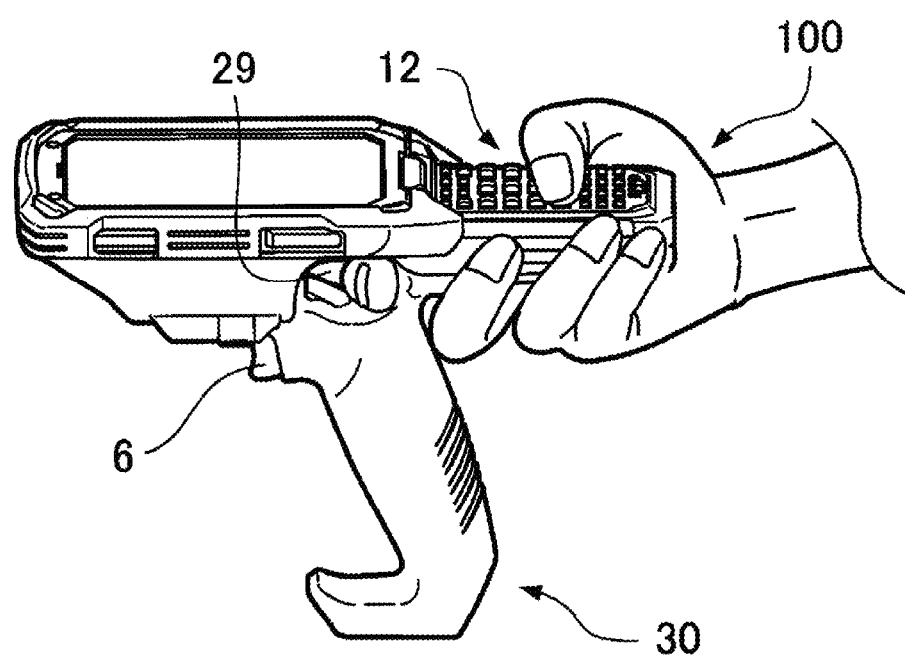
FIG. 15D is a perspective view of the optical information reading device viewed from the upper side, showing the state where the key arrangement part is operated.

FIGS. 15A to 15D are all perspective views of the optical information reading device 100 viewed from the upper side. FIG. 15A shows the state where the trigger 6 is operated. FIG. 15B shows the first stage of changing the grip from operating the trigger 6 to operating the key arrangement part 12. FIG. 15C shows the second stage of changing the grip from operating the trigger 6 to operating the key arrangement part 12. FIG. 15D shows the state of operating the key arrangement part 12.

As shown in FIG. 15A, when the trigger 6 is operated with the index finger, the grip portion 30 is gripped with the remaining four fingers and the palm. This state is the state in which the trigger 6 can be operated.

Next, as shown in FIG. 15B, for switching, the index finger is inserted into the finger insertion space 29. Then, as shown in FIG. 15C, while the index finger remains hooked in the finger insertion space 29, the remaining four fingers and the palm are opened from the grip portion 30.

Subsequently, as shown in FIG. 15D, while the index finger remains hooked in the finger insertion space 29, the remaining four fingers and the palm grip around the key arrangement part 12. This state is the state in which the key arrangement part 12 can be operated.

As shown in FIGS. 15A to 15D, switching the grip can be done with one hand only, without requiring the other hand. The action for switching the grip is completed by simply moving the index finger from the trigger 6 to the finger insertion space 29 (FIGS. 15A and 15B), opening the remaining four fingers and palm from the grip portion 30 (FIG. 15C), and gripping around the key arrangement part 12 with the remaining four fingers and palm (FIG. 15D).

Figure 16:
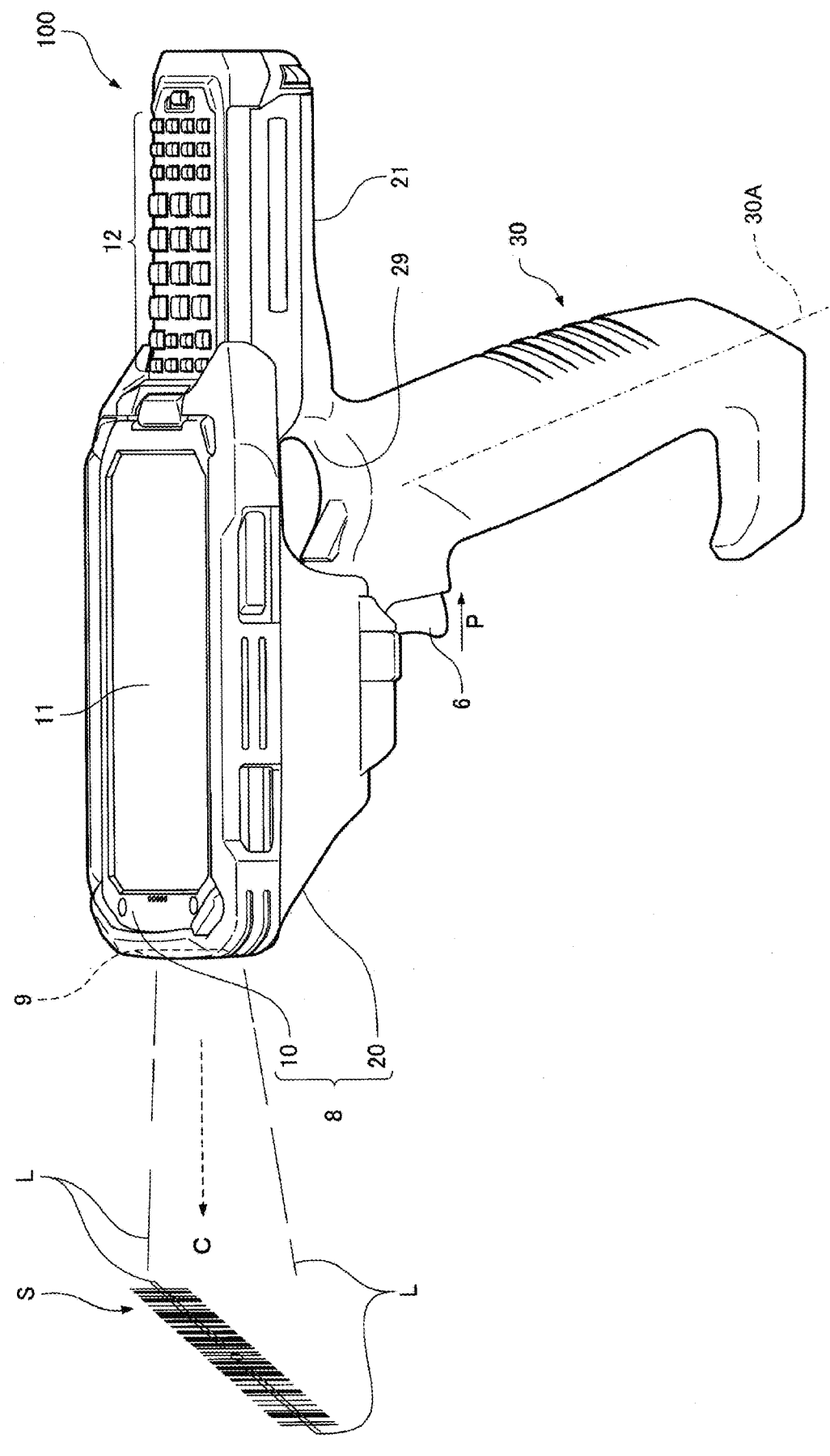
FIG. 16 is a perspective view of the optical information reading device viewed from the upper side.

The following describes in detail the arrangement of the finger insertion space 29 with reference to FIG. 16. FIG. 16 is a perspective view of the optical information reading device 100 viewed from the upper side.

As shown in FIG. 16, the second main surface 20 has a corresponding surface 21 corresponding to the key arrangement part 12. The finger insertion space 29 includes a point where a surface along the corresponding surface 21 intersects with the axis 30A of the grip portion 30.

With the aforementioned configuration, the center of gravity of the housing 8 and the finger insertion space 29 become close to each other. Therefore, the optical information reading device 100 can improve stability when being held differently.

The axis 30A of the grip portion 30 is the centroid in the cross section of the grip portion 30. The surface along the corresponding surface 21 and the axis 30A of the grip portion 30 do not necessarily need to be perpendicular, but should intersect.

The finger insertion space 29 is positioned between the key arrangement part 12 and the trigger 6 in the predetermined direction C. In other words, the finger insertion space 29 is located on the path for moving a finger from the trigger 6 to the key arrangement part 12 in the predetermined direction C.

With the aforementioned configuration, it becomes possible to move a finger gradually from the trigger 6 through the finger insertion space 29 to the key arrangement part 12 in the predetermined direction C. Therefore, the optical information reading device 100 can reduce the risk of dropping when being switched from one hand to another.

The finger insertion space 29 is located between the key arrangement part 12 and the trigger 6 on the axis 30A of the grip portion 30. In other words, the finger insertion space 29 is positioned on the path for moving a finger from the trigger 6 to the key arrangement part 12 along the axis 30A of the grip portion 30.

With the aforementioned configuration, it becomes possible to move a finger gradually from the trigger 6 through the finger insertion space 29 to the key arrangement part 12 along the axis 30A of the grip portion 30. Therefore, the optical information reading device 100 can reduce the risk of dropping when being switched between hands.

Figure 17:
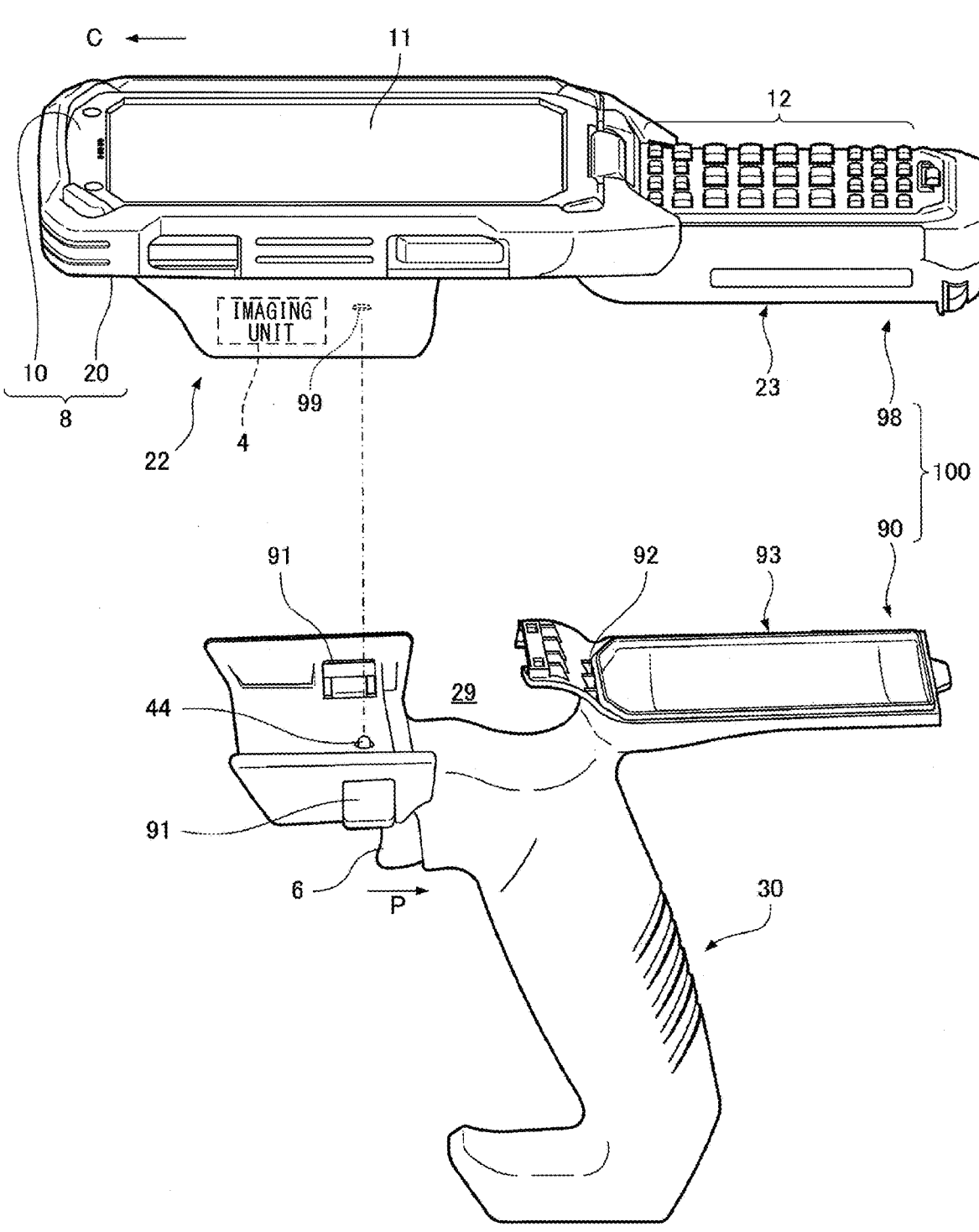
FIG. 17 is a perspective view of the optical information reading device viewed from the upper side.

Next, referring to FIG. 17, another example of the finger insertion space 29 will be explained. FIG. 17 is a perspective view of the optical information reading device 100 viewed from the upper side.

As shown in FIG. 17, the optical information reading device 100 is of an attachment type. Specifically, the optical information reading device 100 further includes a main body 98 and a detachable part 90. The detachable part 90 is detachably attachable to the main body 98.

The main body 98 includes at least the housing 8. The detachable part 90 includes at least the grip portion 30 and the trigger 6. The finger insertion space 29 is formed when the detachable part 90 is attached to the main body 98.

The optical information reading device 100 includes a main body 98 and a detachable part 90, allowing selection of the main body 98 or the detachable part 90 suitable for use. Additionally, the optical information reading device 100 has components requiring water resistance arranged in the main body 98, thus enhancing water resistance.

Although not illustrated, the finger insertion space 29 may be formed in the detachable part 90 rather than being formed by attaching the detachable part 90 to the main body 98. By forming the finger insertion space 29 in the detachable part 90, even if a finger is hooked into the finger insertion space 29, no force is generated to separate the main body 98 from the detachable part 90.

The detachable part 90 has a protrusion 44 that protrudes when the trigger 6 is pressed in the pressing direction P. The main body 98 has a communication hole 99 through which the protrusion 44 can pass. When the detachable part 90 is attached to the main body 98, the protrusion 44 protrudes through the communication hole 99 until it causes the imaging unit 4 to capture an image when the trigger 6 is pressed in the pressing direction P.

Even for an attachment-type optical information reading device 100, having a protrusion 44 and a communication hole 99 simplifies the configuration for imaging by the trigger 6. Therefore, the optical information reading device 100 can simplify its configuration.

The second main surface 20 has a battery storage compartment 23 at a position corresponding to the key arrangement part 12. The detachable part 90 has a cover part 93. The cover part 93 covers the battery storage compartment 23 when the detachable part 90 is attached to the main body 98.

By covering the battery storage compartment 23 with the cover part 93 of the detachable part 90, an additional battery cover for covering the battery storage compartment 23 becomes unnecessary. Therefore, the optical information reading device 100 can reduce the number of components.

The cover part 93 preferably not only covers the battery storage compartment 23 but also fits into the battery storage compartment 23. The cover part 93 has a battery fitting part 92 for fitting into the battery storage compartment 23. The optical information reading device 100 can firmly attach the detachable part 90 to the main body 98 by fitting the cover part 93 into the battery storage compartment 23.

The detachable part 90 has a first fitting part 91 and a second fitting part 92. The first fitting part 91 fits with the portion corresponding to the display unit 11 on the second main surface 20. The second fitting part 92 fits with the portion corresponding to the key arrangement part 12 on the second main surface 20. The finger insertion space 29 is located between the first fitting part 91 and the second fitting part 92. The optical information reading device 100 can improve stability by having the finger insertion space 29 located between the first fitting part 91 and the second fitting part 92.

The second fitting part 92 may be, for example, a battery fitting part 92, or it may be provided at a position different from the battery fitting part 92.

The finger insertion space 29 is a completely enclosed (closed) space surrounding the periphery in a direction along the display unit 11, intersecting the predetermined direction C. By making the finger insertion space 29 a closed space, the optical information reading device 100 can improve stability.

The housing 8 further includes a compartment 22 provided on the second main surface 20. The compartment 22 contains the imaging unit 4. The finger insertion space 29 is surrounded by the compartment 22 on the predetermined direction C side.

Figure 18:
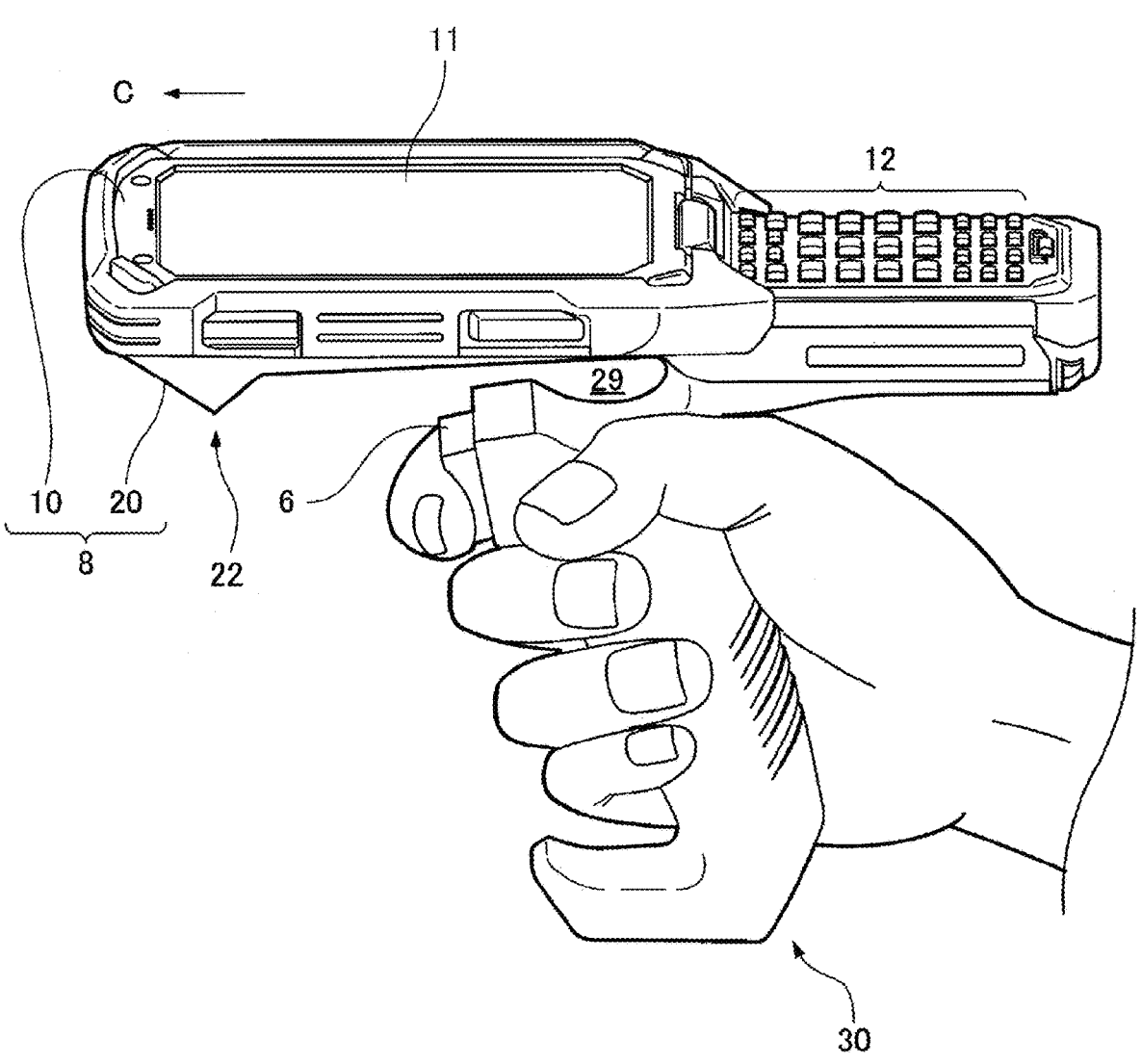
FIG. 18 is a perspective view of the optical information reading device with the finger insertion space open, viewed from the upper side.
Figure 19:
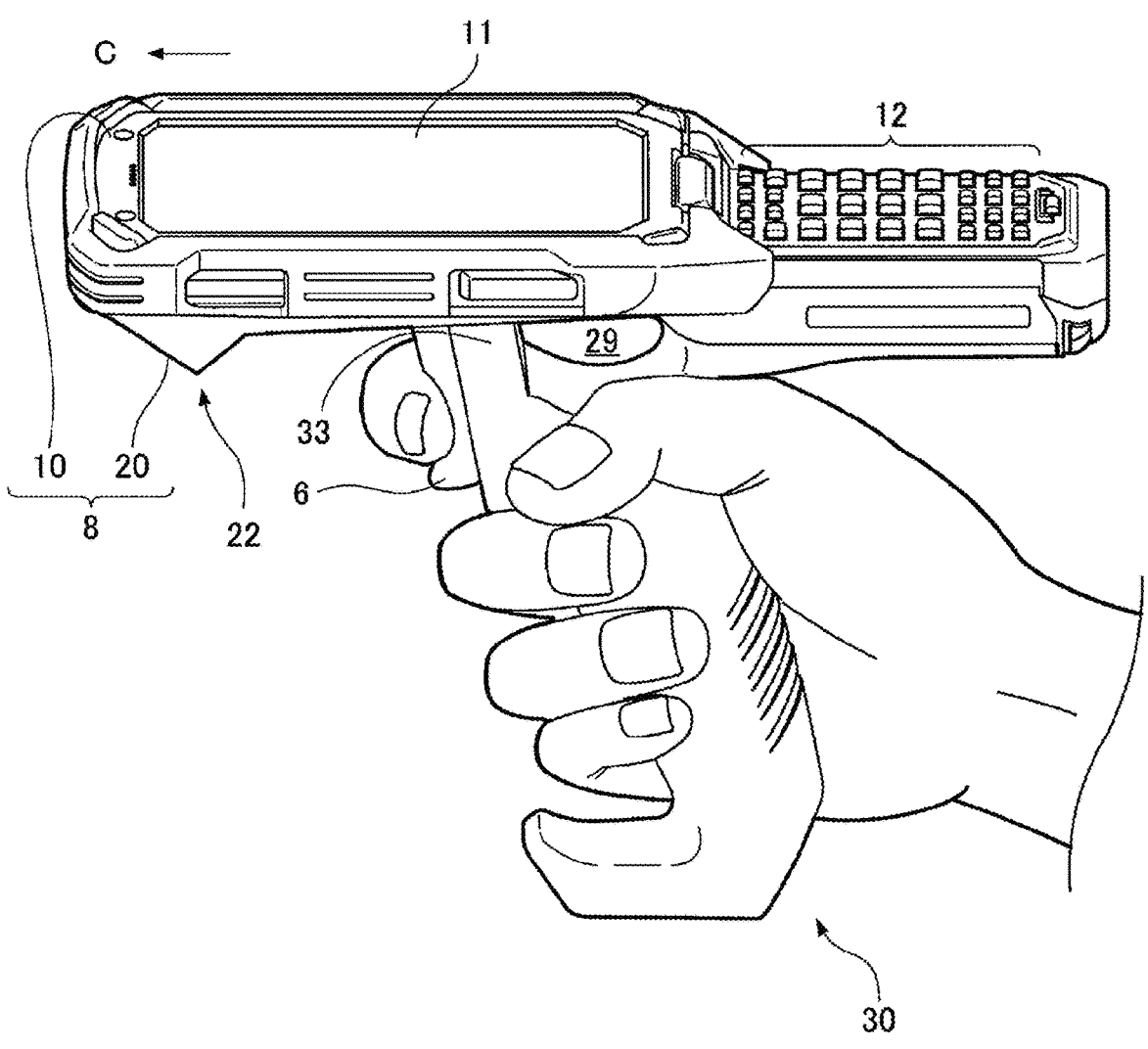
FIG. 19 is a perspective view of the optical information reading device with the finger insertion space located near the trigger, viewed from the upper side.

The following describes another example of the finger insertion space 29 with reference to FIG. 18 and FIG. 19. FIG. 18 is a perspective view of the optical information reading device 100 with the finger insertion space 29 open, viewed from the upper side. FIG. 19 is a perspective view of the optical information reading device 100 with the finger insertion space 29 positioned near the trigger 6, viewed from the upper side.

As shown in FIG. 18, the finger insertion space 29 is not a closed space, but a space that is open on the predetermined direction C side. In other words, the finger insertion space 29 is not enclosed on the predetermined direction C side.

Since the finger insertion space 29 is an open space, it is possible to insert a finger into the finger insertion space 29 from the open predetermined direction C side. Therefore, the optical information reading device 100 can facilitate switching from the operation of the trigger 6 to the operation of the key arrangement part 12.

The compartment 22, which is located on the predetermined direction C side from the finger insertion space 29, is miniaturized and arranged at the end of the housing 8 on the predetermined direction C side, also to avoid closing the finger insertion space 29.

As shown in FIG. 19, the grip portion 30 has an extension member 33 that extends to the housing 8 side. The extension member 33 closes the insertion space 29 on the predetermined direction C side. The trigger 6 is arranged on the extension member 33.

With the aforementioned configuration, the finger insertion space 29 is positioned near the trigger 6. Therefore, the optical information reading device 100 can facilitate switching from operating the trigger 6 to operating the key arrangement part 12.

Figure 20:
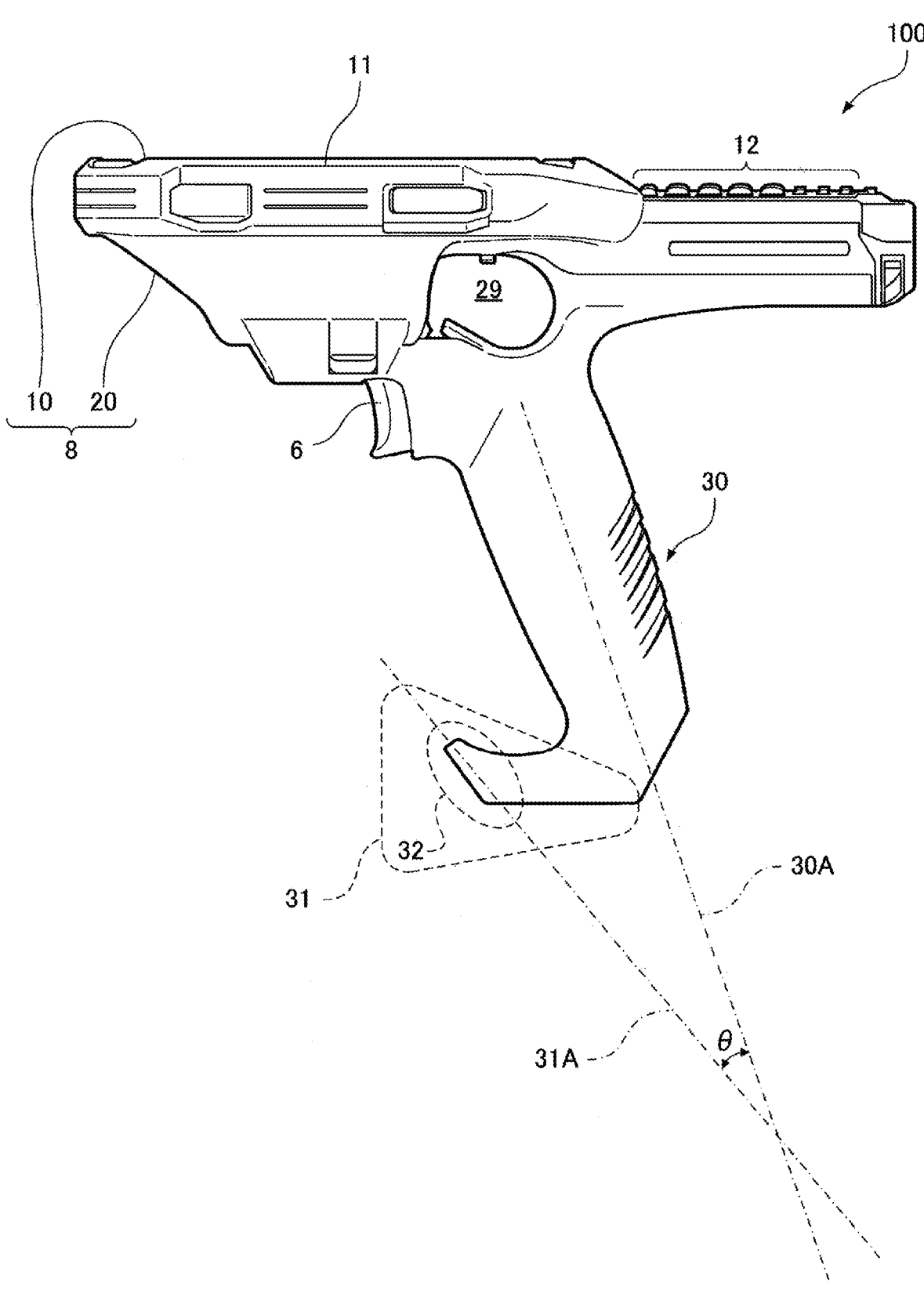
FIG. 20 is a side view of the optical information reading device.

The following describes the optical information reading device 100 that becomes easy to carry, with reference to FIG. 20. FIG. 20 is a side view of the optical information reading device 100.

Before explaining the optical information reading device 100 shown in FIG. 20, the problems of conventional optical information reading devices will be explained.

Conventional optical information reading devices either had nothing at the end of the grip portion 30, or had a component that fingers could not be hooked onto. Therefore, when being carried, conventional optical information reading devices did not allow fingers to be hooked onto the end of the grip portion 30, thus causing inconvenience to the user, such as requiring both hands. In other words, conventional optical information reading devices had the problem of not being easily portable. Therefore, the technical concept of the optical information reading device 100 shown in FIG. 20 is to solve this problem.

As shown in FIG. 20, the optical information reading device 100 further includes a folded part 31. The folded part 31 is provided on the opposite side of the housing 8 in the grip portion 30. The folded part 31 forms an acute angle θ with respect to the grip portion 30.

By forming the folded part 31 at an acute angle θ with respect to the grip portion 30, it becomes possible to hook one's fingers on the folded part 31. Therefore, the optical information reading device 100 can be easily carried.

The folded part 31 forming an acute angle θ with respect to the grip portion 30 means that the axis 31A of the folded part 31 and the axis 30A of the grip portion 30 form an acute angle θ. The axis 31A of the folded part 31 is the centroid in the cross section of the folded part 31. The axis 30A of the grip portion 30 is the centroid in the cross section of the grip portion 30.

It is not necessary for the entire folded part 31 to form an acute angle θ with respect to the grip portion 30, and it is sufficient if a part of the folded part 31 (preferably the tip portion 32 of the grip portion 30) forms an acute angle θ with respect to the grip portion 30.

The optical information reading device 100 equipped with the aforementioned folded part 31 is not limited to handy terminals, but also includes handheld scanners. Handheld scanners do not have a display unit 11 and a key arrangement part 12. In other words, the characteristics of the optical information reading device 100, which includes handheld scanners, are as follows.

An optical information reading device that captures an image of a symbol to be read and reads information of the captured symbol, comprising:

an imaging unit that captures images in a predetermined direction;

a reading unit that reads information of the symbol from the image generated by the imaging of the imaging unit;

a housing in which the imaging unit and the reading unit are internally arranged;

a grip portion provided on the housing;

a trigger provided on the grip portion, which starts an imaging of the imaging unit when pressed in a pressing direction opposite to the predetermined direction;

a folded part provided on an end of the grip portion, the end being opposite side of the housing;

wherein the folded part forms an acute angle with respect to the grip portion.

Embodiment 3

Figure 21:
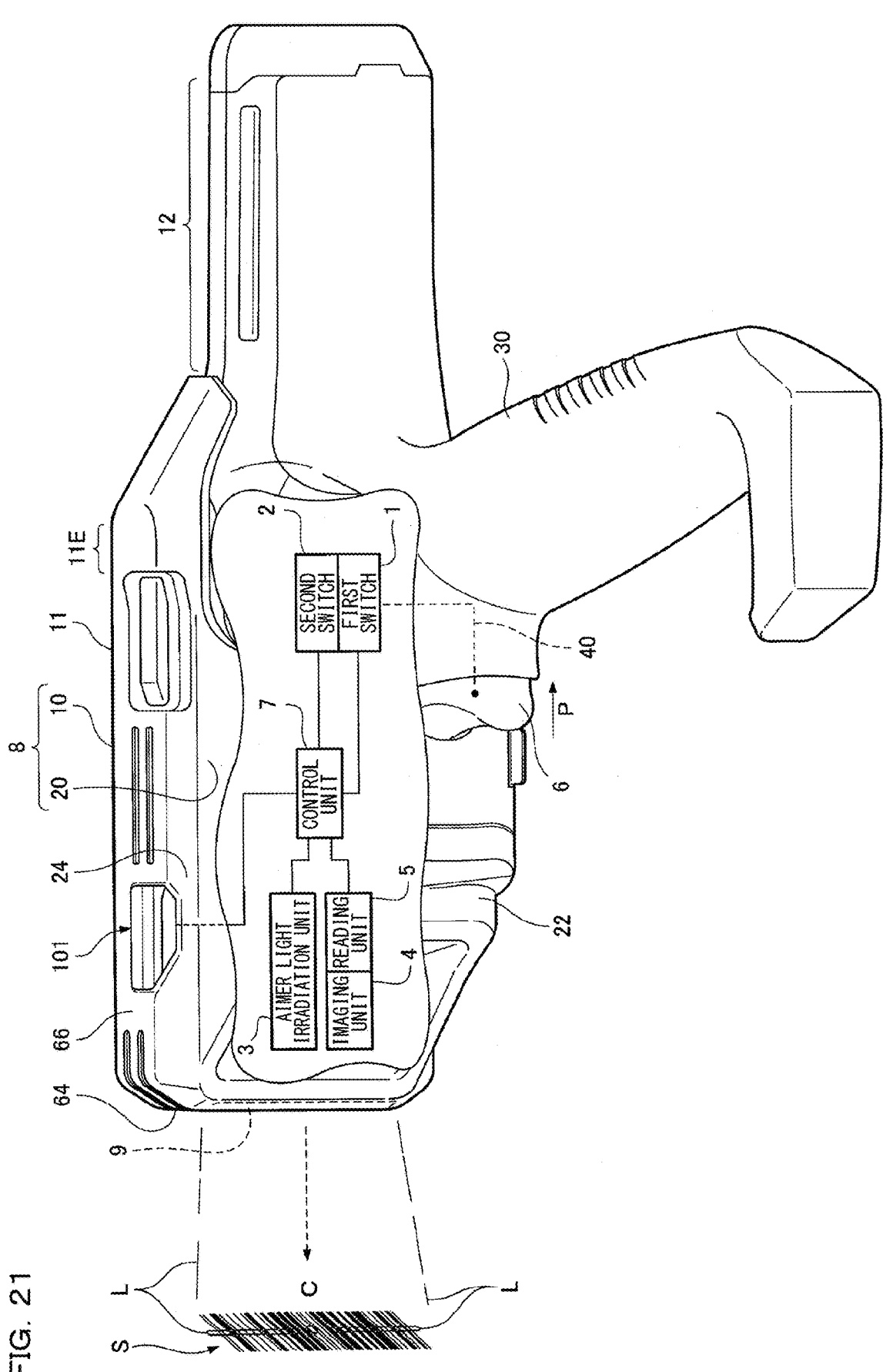
FIG. 21 is a perspective view of an optical information reading device according to Embodiment 3 viewed from the lower side.

The following description will explain the optical information reading device 100 according to Embodiment 3 of this disclosure with reference to the drawings. First, referring to FIG. 21, an outline of the optical information reading device 100 according to Embodiment 3 will be explained. FIG. 21 is a perspective view of the optical information reading device 100 according to Embodiment 3 viewed from the lower side.

As shown in FIG. 21, the optical information reading device 100 captures an image of a symbol S that is the reading target, and reads the information of the captured symbol S. The optical information reading device 100 includes an imaging unit 4, a reading unit 5, and a housing 8.

The imaging unit 4 captures images in a predetermined direction C. The reading unit 5 reads information of the symbol S from the image generated by the imaging of the imaging unit 4. The housing 8 has the imaging unit 4 and the reading unit 5 arranged inside. The housing 8 has a first main surface 10 with a display unit 11 that displays information, and a second main surface 20 which is the opposite surface of the first main surface 10.

The optical information reading device 100 further includes a grip portion 30, a push button 6, a first light-emitting unit 101, and a control unit 7. The grip portion 30 extends from the end portion 11E on the opposite side of the predetermined direction C in the display unit 11. The push button 6 starts imaging of the imaging unit 4 when pressed in the pressing direction P.

The first light-emitting unit 101 is provided on at least one of the side surfaces 64, 66 connecting the first main surface 10 and the second main surface 20, and the second main surface 20. The control unit 7 causes the first light-emitting unit 101 to emit light based on the reading situation by the reading unit 5.

The optical information reading device 100, by having the first light-emitting unit 101 provided on the side surfaces 64, 66 and/or the second main surface 20, allows the user to grasp the reading situation even in a posture where the first main surface 10 cannot be visually recognized.

The grip portion 30 shown in FIG. 21 is provided on the second main surface 20. The grip portion 30 provided on the second main surface 20 extends from the end portion 11E on the opposite side of the predetermined direction C in the display unit 11. In other words, the grip portion 30 faces the end portion 11E on the opposite side of the predetermined direction C in the display unit 11.

The optical information reading device 100 may not include the grip portion 30 shown in FIG. 21. In such an optical information reading device 100, for example, as shown in FIG. 13, the area surrounding the key arrangement part 12 becomes the portion to be gripped (i.e., the grip portion). The surrounding area of the key arrangement part 12 (grip portion) also extends from the end 11E on the opposite side of the predetermined direction C in the display unit 11. In other words, the surrounding area of the key arrangement part 12 (grip portion 30) also faces the end 11E on the opposite side of the predetermined direction C in the display unit 11.

As shown in FIG. 21, the first light-emitting unit 101 is positioned on the predetermined direction C side relative to the grip portion 30. By being positioned on the predetermined direction C side relative to the grip portion 30, the first light-emitting unit 101 is less likely to be hidden by the hand gripping the grip portion 30. Therefore, the optical information reading device 100 can easily grasp the reading situation.

The first light-emitting unit 101 is provided on the side surfaces 64, 66 connecting the first main surface 10 and the second main surface 20. The optical information reading device 100, with the first light-emitting unit 101 provided on the side surfaces 64, 66, allows the user to grasp the reading situation even in a posture where the first main surface 10 and the second main surface 20 cannot be visually recognized.

The side surfaces 64, 66 on which the first light-emitting unit 101 is provided include a side surface 64 in the predetermined direction C and a side surface 66 in a direction along the display unit 11 perpendicular to the predetermined direction C. To improve visibility, it is preferable that the first light-emitting unit 101 is provided on the side surface 66 in the direction along the display unit 11 perpendicular to the predetermined direction C.

Each of the side surfaces 64, 66 may not be a single surface, but may be divided into a surface on the first main surface 10 side and a surface on the second main surface 20 side. In this case, it is preferable that the first light-emitting unit 101 is provided on the surface on the second main surface 20 side to improve visibility.

The first light-emitting unit 101 is provided on the second main surface 20. The optical information reading device 100, by having the first light-emitting unit 101 provided on the second main surface 20, allows the user to grasp the reading situation even in a posture where the first main surface 10 and side surfaces 64, 66 cannot be visually recognized.

Figure 22:
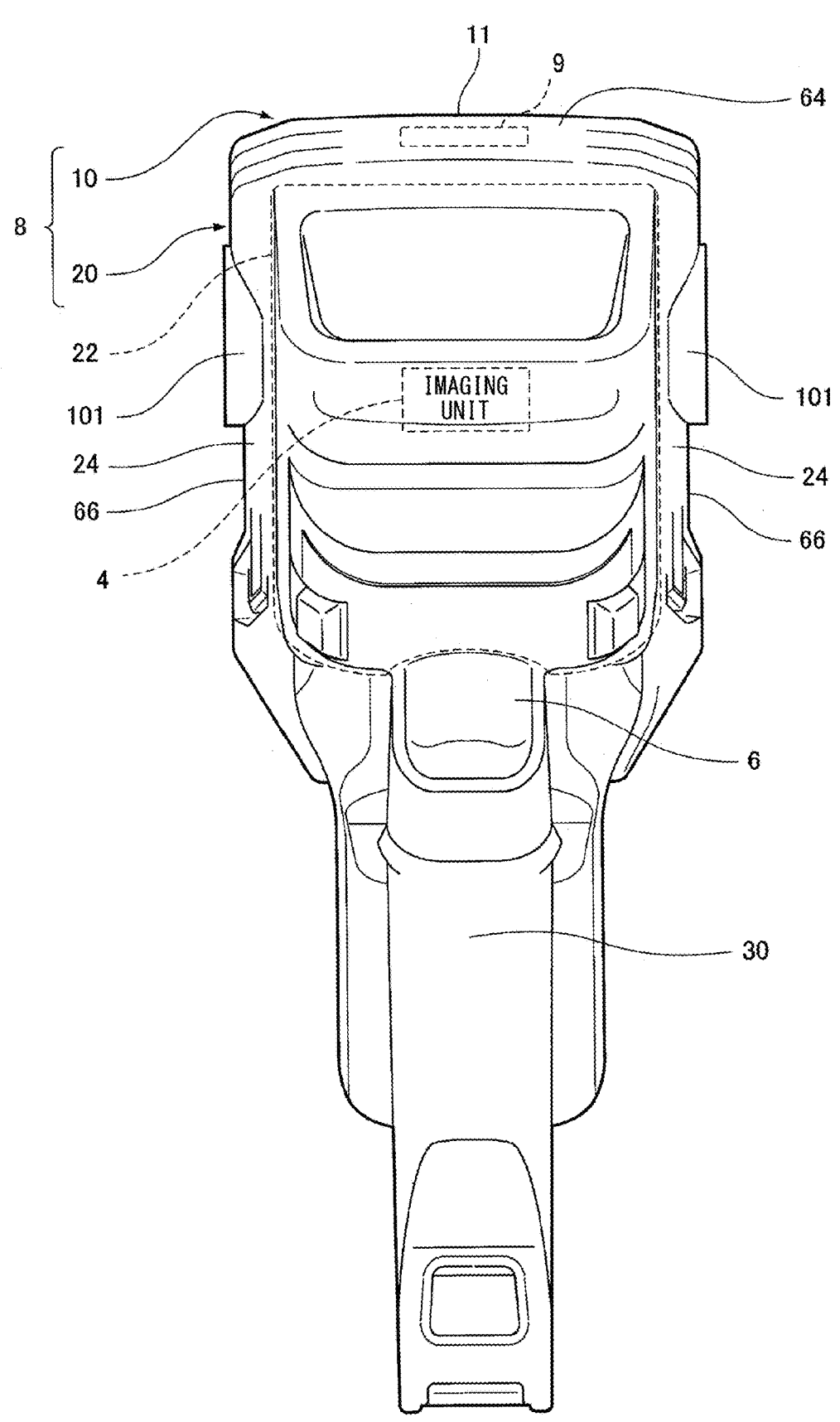
FIG. 22 is a perspective view of the optical information reading device viewed from the side to be imaged and the second main surface side.
Figure 23:
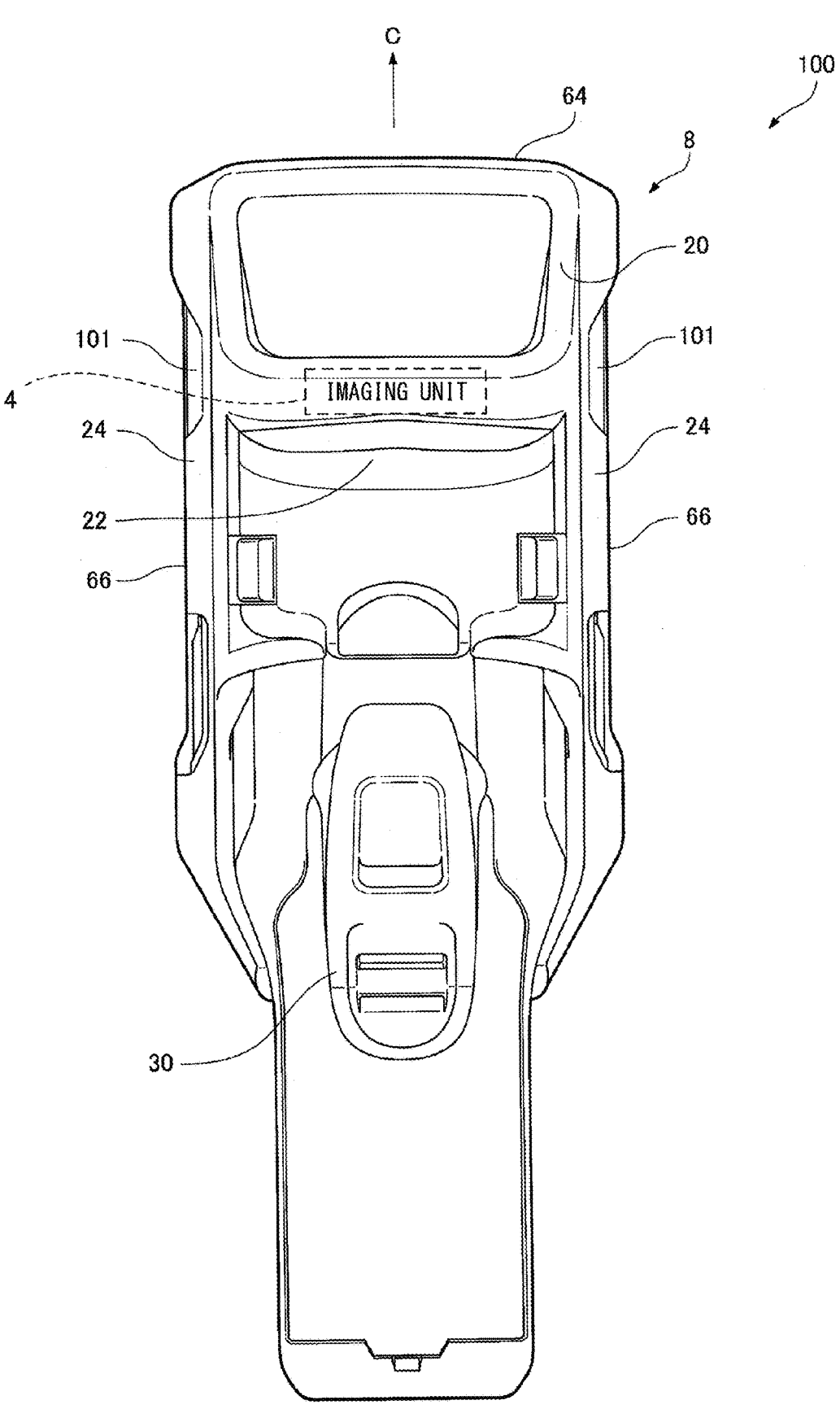
FIG. 23 is a rear view of the optical information reading device viewed from the second main surface side.

Next, referring to FIG. 22 and FIG. 23, the first light-emitting unit 101 will be described in detail. FIG. 22 is a perspective view of the optical information reading device 100 viewed from the side to be imaged and the second main surface 20 side. FIG. 23 is a rear view of the optical information reading device 100 viewed from the second main surface 20 side.

As shown in FIG. 22, the first light-emitting unit 101 provided on the side surface 66 is positioned outside the first main surface 10. The first light-emitting unit 101 positioned outside the first main surface 10 can also be visually recognized from the first main surface 10. Therefore, the optical information reading device 100 can improve visibility.

The housing 8 further includes a compartment 22 provided on the second main surface 20. The compartment 22 contains the imaging unit 4. The second main surface 20 has a pair of steps 24. The pair of steps 24 extends to the compartment 22 in both directions along the display unit 11, perpendicular to the predetermined direction C. The first light-emitting unit 101 is positioned on the pair of steps 24.

By positioning the first light-emitting unit 101 at the pair of steps 24, the arrangement of the first light-emitting unit 101 effectively utilizes the shape of the housing 8. Therefore, the optical information reading device 100 can be miniaturized.

As shown in FIG. 22 and FIG. 23, the first light-emitting unit 101 provided on the side surface 66 is positioned in both directions along the display unit 11, perpendicular to the predetermined direction C. Therefore, from the perspective of the user gripping the grip portion 30, the first light-emitting unit 101 is located on the left and right sides of the housing 8. In other words, if the user is gripping the grip portion 30 with their right hand, they can visually recognize the left first light-emitting unit 101, and if they are gripping the grip portion 30 with their left hand, they can visually recognize the right first light-emitting unit 101. As a result, the optical information reading device 100 can easily grasp the reading situation.

Figure 24:
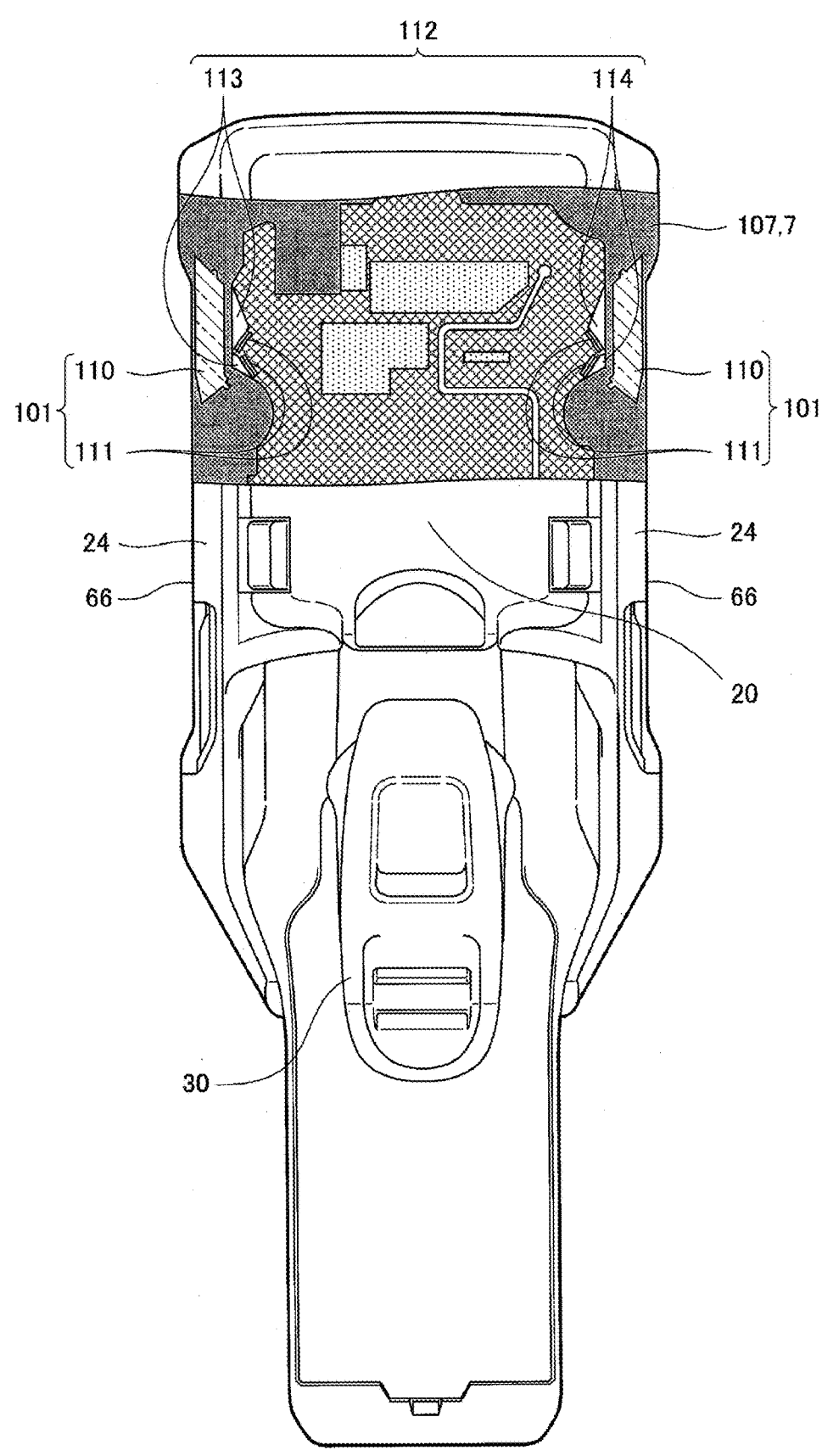
FIG. 24 is a partial cutaway rear view with the area around the first light-emitting unit in FIG. 23 partially cut away.

The following describes the interior of the housing 8 with reference to FIG. 24. FIG. 24 is a partial cutaway rear view of the area around the first light-emitting unit 101 in FIG. 23.

As shown in FIG. 24, the first light-emitting unit 101 includes a light emitting element 111 and a diffusion member 110. The light emitting element 111 emits light. The diffusion member 110 diffuses the light from the light emitting element 111. Therefore, since the light emitted from the first light-emitting unit 101 of the optical information reading device 100 is diffused light, visibility can be improved.

The diffusion member 110 has a curved surface on the side where light is diffused. The curved portion of the diffusion member 110 corresponds to the part from the side surface 66 of the housing 8 to the second main surface 20. Therefore, the diffusion member 110 efficiently diffuses light. As a result, the optical information reading device 100 can improve visibility.

The diffusion member 110 is made of, for example, rubber or plastic resin. The diffusion member 110 is preferably milky white to further improve visibility.

The optical information reading device 100 further includes a main board 107. The control unit 7 is implemented on the main board 107. The first light-emitting unit 101 is arranged at both ends of the main board 107.

The light emitting element 111 of the first light-emitting unit 101 arranged at one end of the main board 107 and the light emitting element 111 of the first light-emitting unit 101 arranged at the other end of the main board 107 emit light in directions away from each other.

With the aforementioned configuration, the optical information reading device 100 can improve visibility even with a small number of light emitting elements 111. On the main board 107, the arrangement of the first light-emitting unit 101 is constrained due to the placement of electronic components such as antennas, so it is effective to be able to reduce the number of light emitting elements 111 in the first light-emitting unit 101.

The main board 107 has a white material 112. The white material 112 is a part where light from the light emitting element 111 is irradiated. By having the white material 112 on the main board 107, light from the light emitting element 111 is reflected by the white material 112. Therefore, the optical information reading device 100 can improve visibility.

The white material 112 is, for example, a white silk-screen printing. The white material 112 may be replaced with another material that has a higher light reflectance than the white material 112.

The white material 112 has a white material 113 on one end side arranged at one end portion of the main board 107, and a white material 114 on the other end side arranged at the other end portion of the main board 107. The white material 113 on one end side and the white material 114 on the other end side have a shape and area such that the amount of light emitted by the first light-emitting unit 101 is equal at the one end portion and the other end portion of the main board 107.

Therefore, the amount of light emitted by the first light-emitting unit 101 is equal at one end and the other end of the main board 107. As a result, the optical information reading device 100 can improve visibility.

The first light-emitting unit 101 has multiple light emitting elements 111 (for example, light emitting diodes). The multiple light emitting elements 111 that one first light-emitting unit 101 has emit light of different colors respectively. In the first light-emitting unit 101, the arrangement of colors of light emitted at one end and the other end is different (asymmetric), but the amount of light is equal at one end and the other end by adjusting the shape and area of the white material 112.

Here, the light amount being equal at one end and the other end of the first light-emitting unit 101 is not strictly limited to the light amount being identical, but allows for a degree where the user perceives the light amount to be the same.

The colors of light emitted from each of the multiple light emitting elements 111 may be, for example, three colors such as the three primary colors of light (red, green, and blue), or two colors, or four or more colors.

Figure 25:
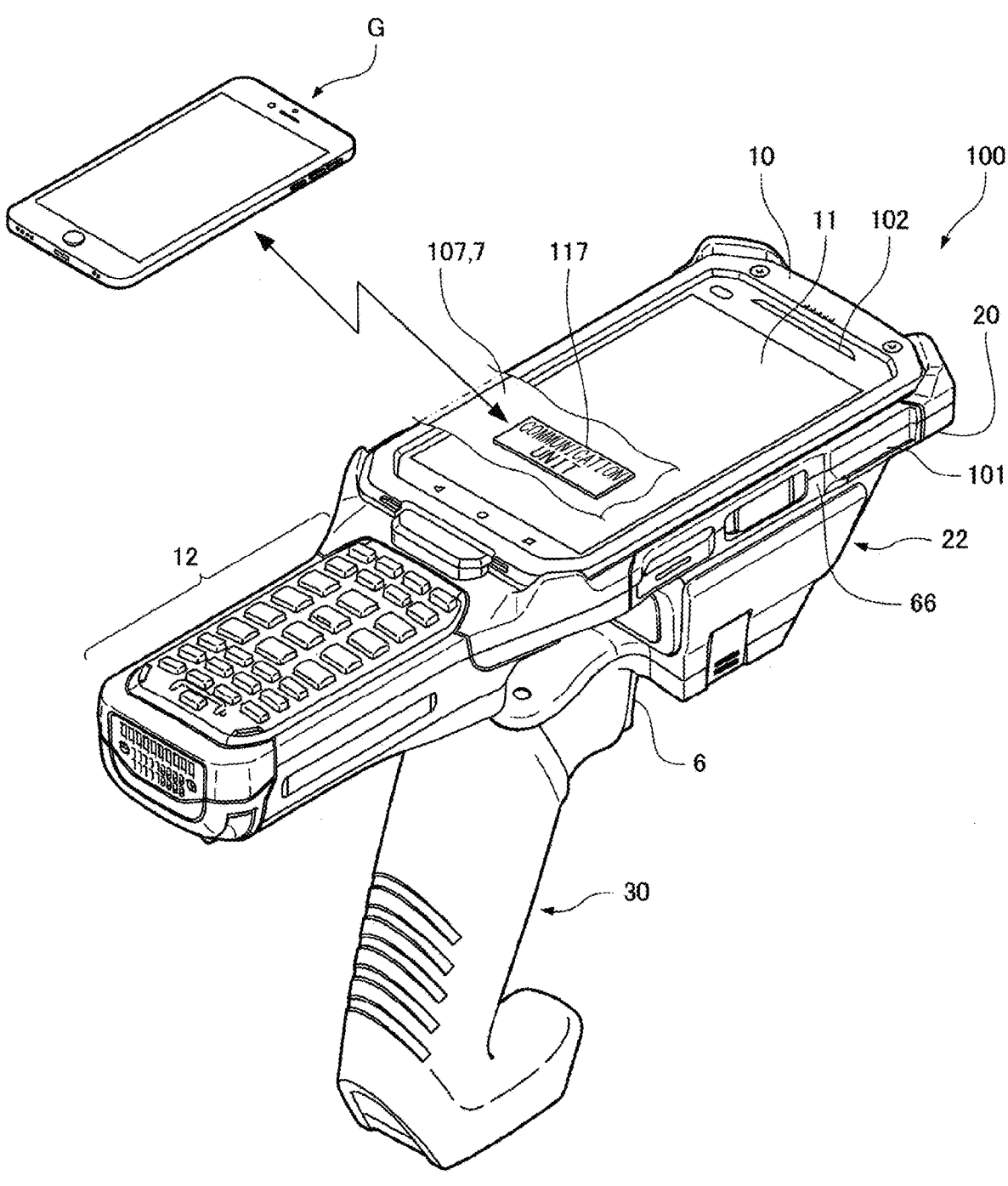
FIG. 25 is a partial cutaway perspective view of the optical information reading device.

The following describes further configuration of the optical information reading device 100 with reference to FIG. 25. FIG. 25 is a partial cutaway perspective view of the optical information reading device 100.

As shown in FIG. 25, the optical information reading device 100 further includes a second light-emitting unit 102 provided on the first main surface 10. Therefore, the optical information reading device 100 can improve visibility by means of the first light-emitting unit 101 and the second light-emitting unit 102.

The optical information reading device 100 further includes a communication unit 117 capable of communicating with an external device G. The control unit 7 causes the first light-emitting unit 101 to emit light through communication from the external device G. Therefore, the highly visible first light-emitting unit 101 emits light through communication with the external device G. As a result, even if the optical information reading device 100 is lost, it can be made easy to find by causing the first light-emitting unit 101 to emit light via the external device G.

It is preferable that the control unit 7 causes the second light-emitting unit 102 to emit light through communication from the external device G. Therefore, even if the optical information reading device 100 is lost, it can be made easy to find by causing the first light-emitting unit 101 and the second light-emitting unit 102 to emit light by the external device G.

The external device G is an external host or the like that can communicate with the communication unit 117. The external device G is not particularly limited as long as it is something other than the optical information reading device 100 and can communicate with the communication unit 117. The side surface connecting the first main surface 10 and the second main surface 20 is arranged on the opposite side of the predetermined direction C of the key operation unit 12 and intersects with the predetermined direction C, and also includes the end surface adjacent to the key operation unit 12, and a light-emitting unit may be provided on this end surface.

By the way, Embodiment 1 to Embodiment 3 are exemplary in all aspects and not restrictive. The scope of this disclosure is indicated not by the foregoing description but by the claims, and it is intended that all changes within the meaning and scope equivalent to the claims are included. Among the configurations described in the embodiments, those other than the configurations described as one aspect of this disclosure in the "means for solving the problem" are optional configurations and can be deleted or modified as appropriate.

This disclosure provides an optical information reading device and has industrial applicability.

What is claimed is:

1. An optical information reading device that captures an image of a symbol to be read and reads information of the captured symbol, comprising:

an imaging unit that has an optical axis extending in a predetermined direction and captures an image;

a reading unit that reads information of the symbol from the image generated by the imaging unit;

a housing in which the imaging unit and the reading unit are internally arranged, the housing including a first main surface where a display unit is provided, and a second main surface that is opposite to the first main surface;

a grip portion extending from an end of the display unit opposite to the predetermined direction;

a push button that, when pressed in a pressing direction, initiates imaging by the imaging unit;

a first light-emitting unit configured to indicate a reading status including whether reading by the reading unit is successful and not configured to illuminate the symbol for the reading, the first light-emitting unit provided on a side surface connecting the first main surface and the second main surface, or on the second main surface, or on both the side surface and the second main surface; and a control unit that causes the first light-emitting unit to emit light based on the reading status of the reading unit, wherein no outward normal line of an outward-facing surface of the first light-emitting unit intersects the optical axis of the imaging unit.

2. The optical information reading device according to claim 1, wherein the first light-emitting unit is positioned on the predetermined direction side with respect to the grip portion.

3. The optical information reading device according to claim 1, wherein the first light-emitting unit is provided on the side surface.

4. The optical information reading device according to claim 3, wherein the first light-emitting unit is provided on the second main surface.

5. The optical information reading device according to claim 3, wherein the first light-emitting unit provided on the side surface is positioned in both directions along the display portion, perpendicular to the predetermined direction.

6. The optical information reading device according to claim 5, wherein the housing further has a compartment provided on the second main surface for containing the imaging unit, the second main surface has a pair of steps extending to the compartment in both directions along the display unit, perpendicular to the predetermined direction, and the first light-emitting unit is positioned at the pair of steps.

7. The optical information reading device according to claim 5, further comprising:

a main board on which the control unit is implemented, wherein the first light-emitting unit is arranged at both ends of the main board, and a light emitting element possessed by the first light-emitting unit arranged at one end of the main board and a light emitting element possessed by the first light-emitting unit arranged at the other end of the main board emit light in directions away from each other.

8. The optical information reading device according to claim 7, wherein the main board has a white material in a portion where light from the light emitting element is irradiated.

9. The optical information reading device according to claim 8, wherein the white material comprises:

a white material on one end side disposed at one end portion of the main board; and a white material on the other end side disposed at the other end portion of the main board, and wherein the white material on the one end side and the white material on the other end side have a shape and area such that the amount of light emitted by the first light-emitting unit is equal at the one end portion and the other end portion of the main board, the optical information reading device.

10. The optical information reading device according to claim 3, wherein the first light-emitting unit provided on the side surface is positioned outside the first main surface.

11. The optical information reading device according to claim 1, wherein the first light-emitting unit comprises:

a light emitting element that emits light; and a diffusion member that diffuses the light from the light emitting element.

12. The optical information reading device according to claim 1, further comprising a second light-emitting unit provided on the first main surface.

13. The optical information reading device according to claim 1, further comprising a communication unit capable of communicating with an external device, wherein the control unit causes the first light-emitting unit to emit light by communication from the external device.

14. An optical information reading device that captures an image of a symbol to be read and reads information of the captured symbol, comprising:

an imaging unit that has an optical axis extending in a predetermined direction and captures an image;

a reading unit that reads information of the symbol from the image generated by the imaging unit;

a housing in which the imaging unit and the reading unit are internally arranged, the housing including a first main surface where a display unit is provided, and a second main surface that is opposite to the first main surface;

a grip portion extending from an end of the display unit opposite to the predetermined direction;

a push button that, when pressed in a pressing direction, initiates imaging by the imaging unit;

a first light-emitting unit provided on a side surface connecting the first main surface and the second main surface; and a control unit that causes the first light-emitting unit to emit light based on the reading status of the reading unit, wherein the first light-emitting unit is positioned in both directions along the display portion, perpendicular to the predetermined direction.

15. The optical information reading device according to claim 14, wherein the first light-emitting unit is provided on the second main surface.

16. An optical information reading device that captures an image of a symbol to be read and reads information of the captured symbol, comprising:

an imaging unit that captures an image in a predetermined direction;

a reading unit that reads information of the symbol from the image generated by the imaging unit;

a housing in which the imaging unit and the reading unit are internally arranged, the housing including a first main surface where a display unit is provided, and a second main surface that is opposite to the first main surface;

a first light-emitting unit configured to indicate a reading status including whether reading by the reading unit is successful and not configured to illuminate the symbol for the reading, the first light-emitting unit provided on a side surface connecting the first main surface and the second main surface, or on the second main surface, or on both the side surface and the second main surface; and a control unit that causes the first light-emitting unit to emit light based on the reading status of the reading unit.

17. The optical information reading device according to claim 16, wherein the first light-emitting unit is provided on the side surface.

* * * * *